Sept. 12, 1961 O. E. MOWERY ET AL 2,999,518
AUTOMATICALLY ADJUSTABLE GAUGING DEVICE FOR
POSITIONING AN ELEMENT
Filed May 12, 1958 9 Sheets-Sheet 4
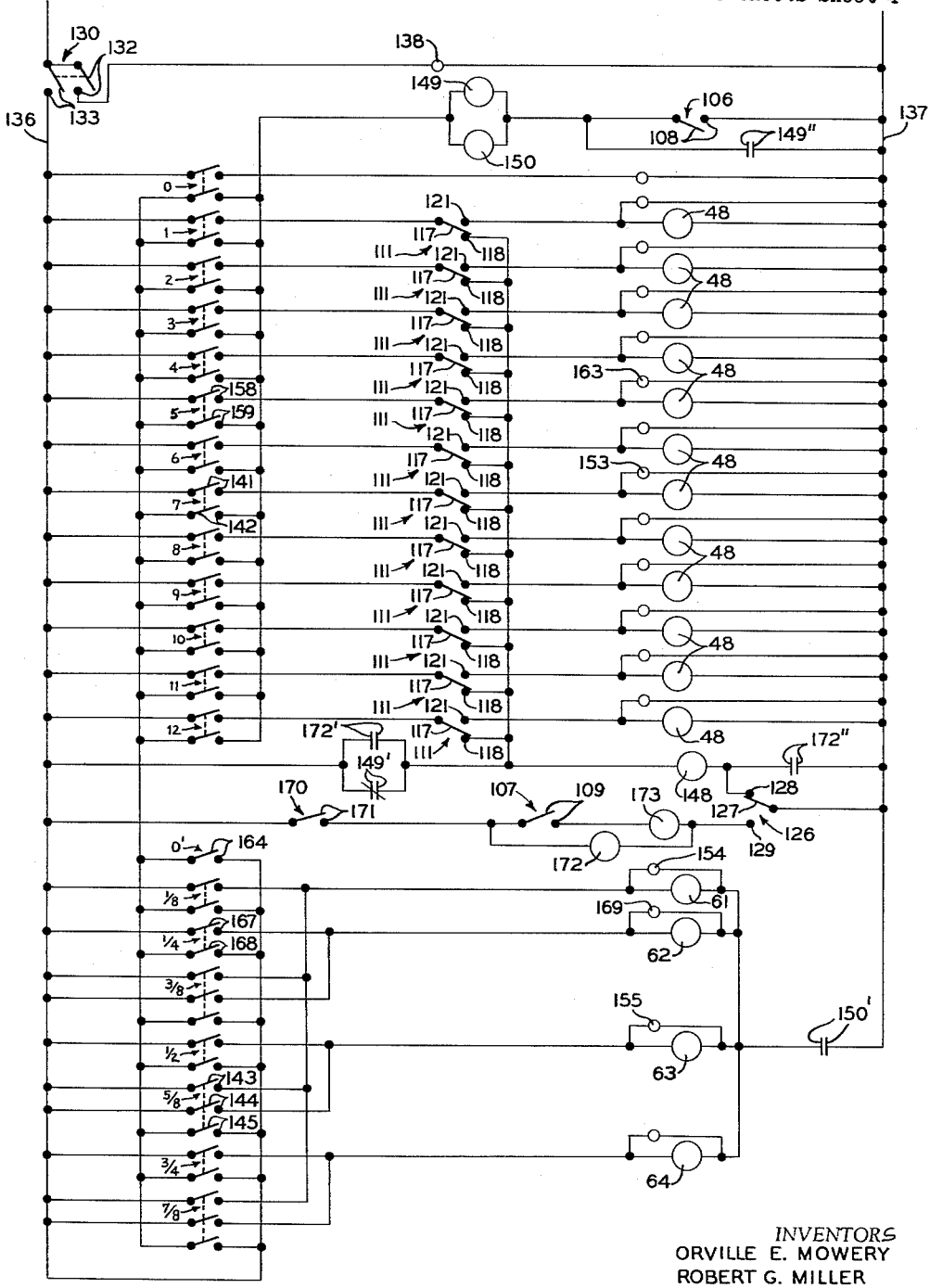
*INVENTORS*
ORVILLE E. MOWERY
ROBERT G. MILLER
BY
*Harold B. Hood*
ATTORNEY

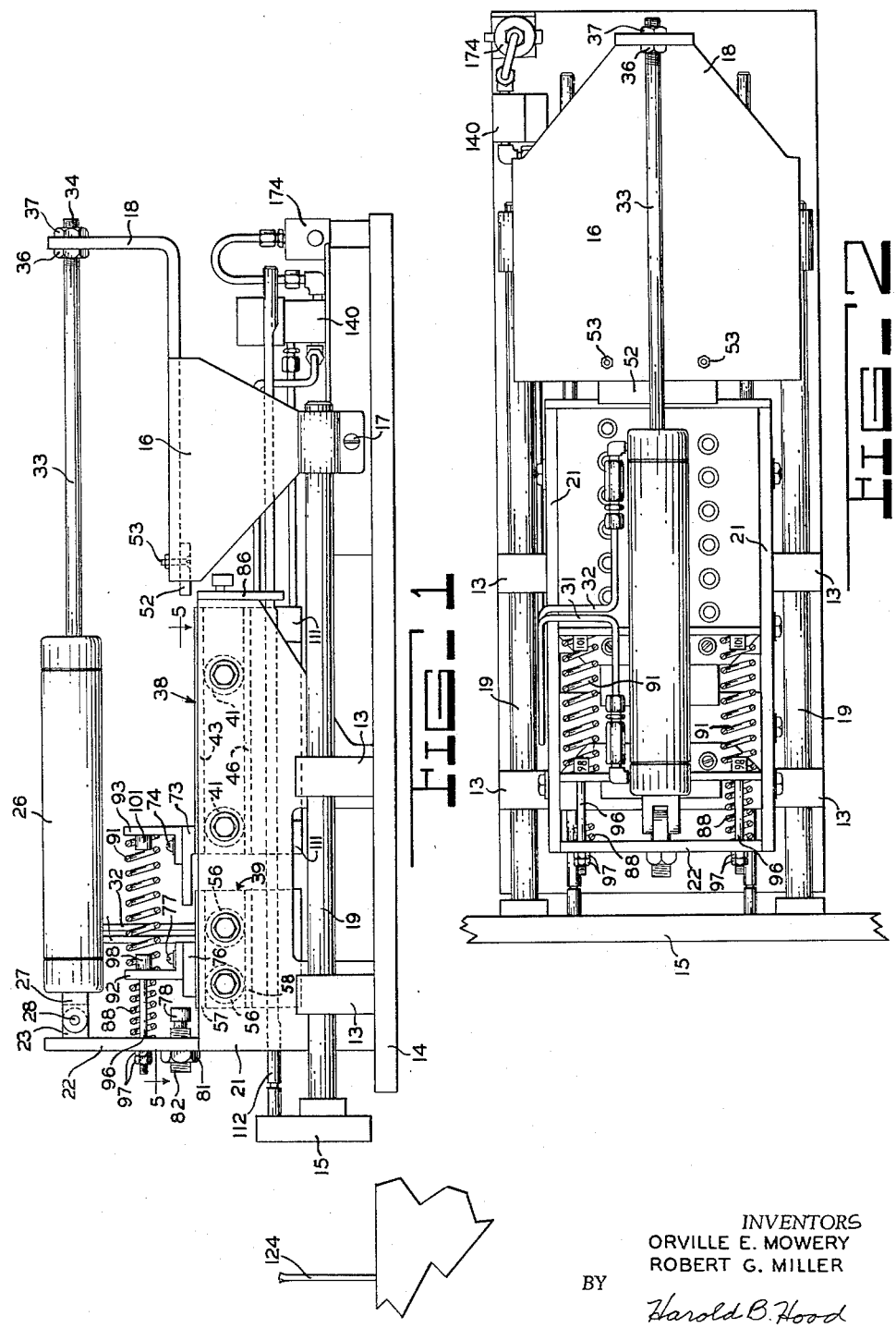

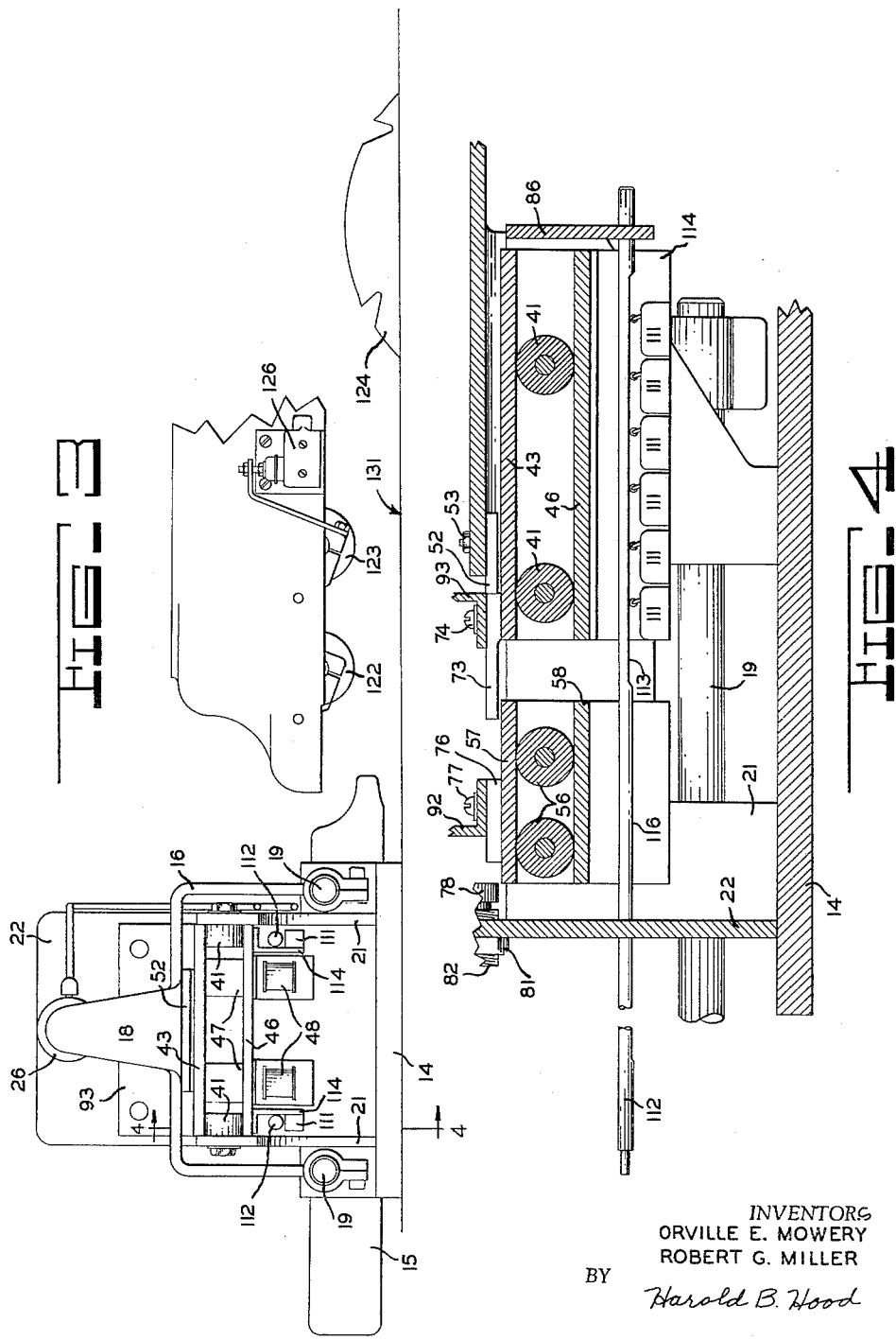

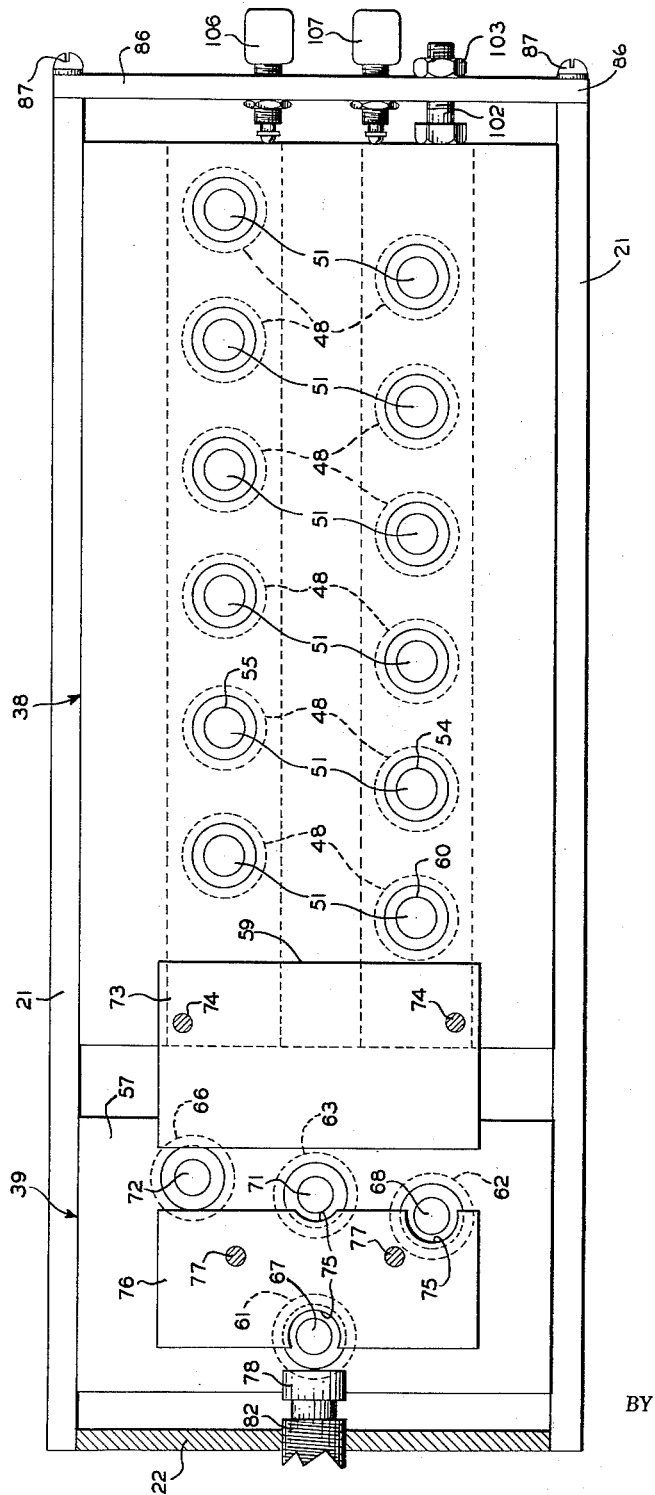

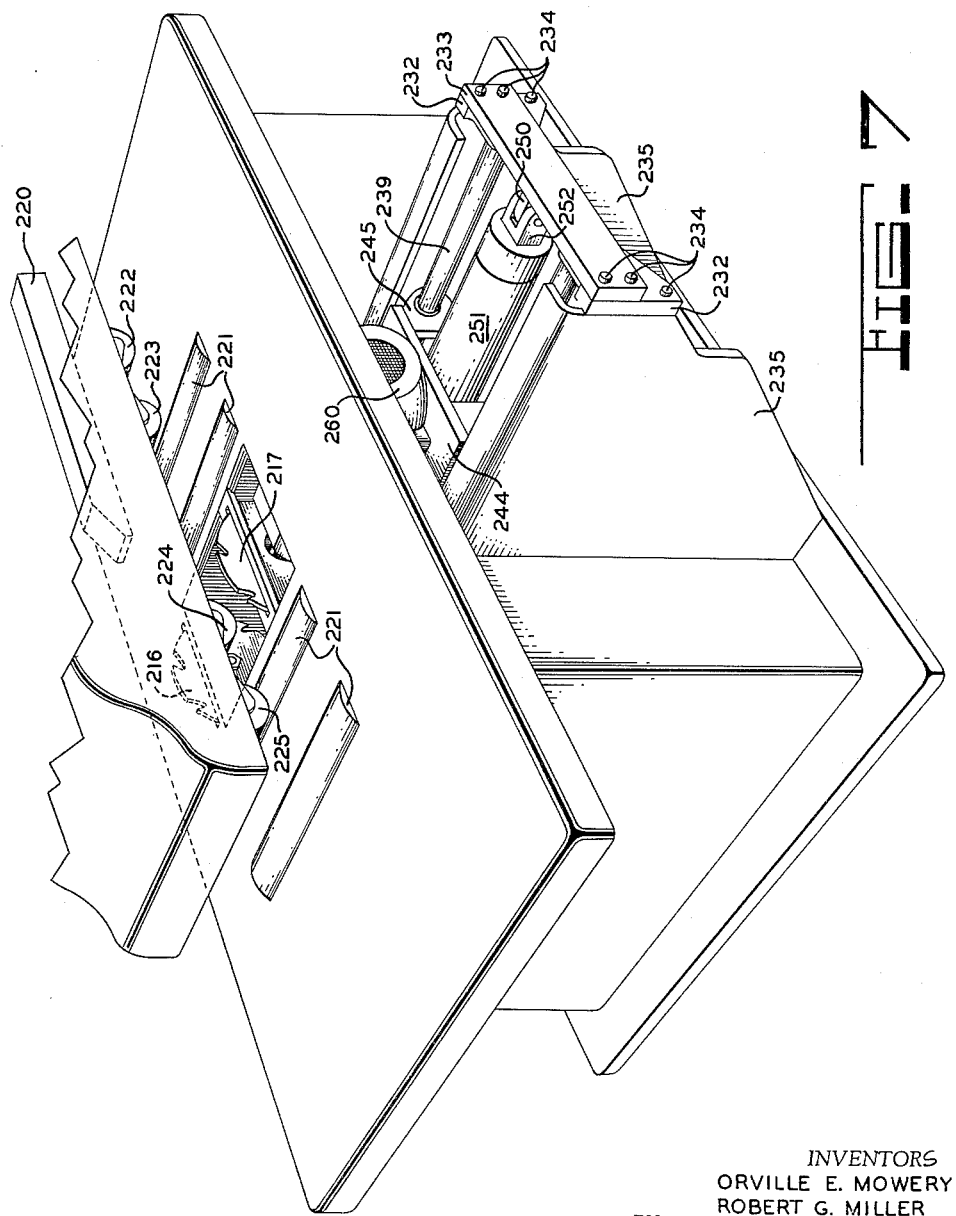

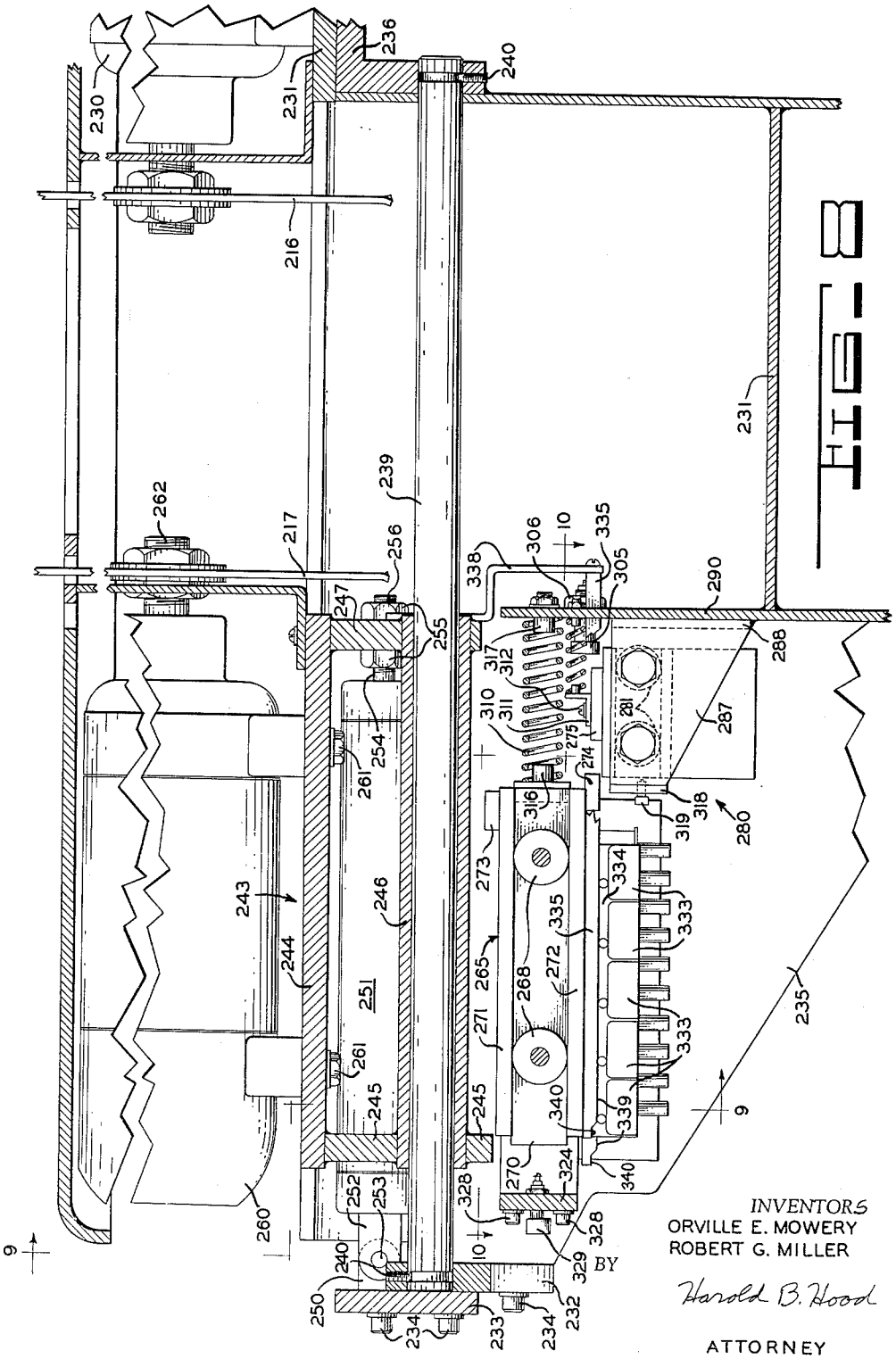

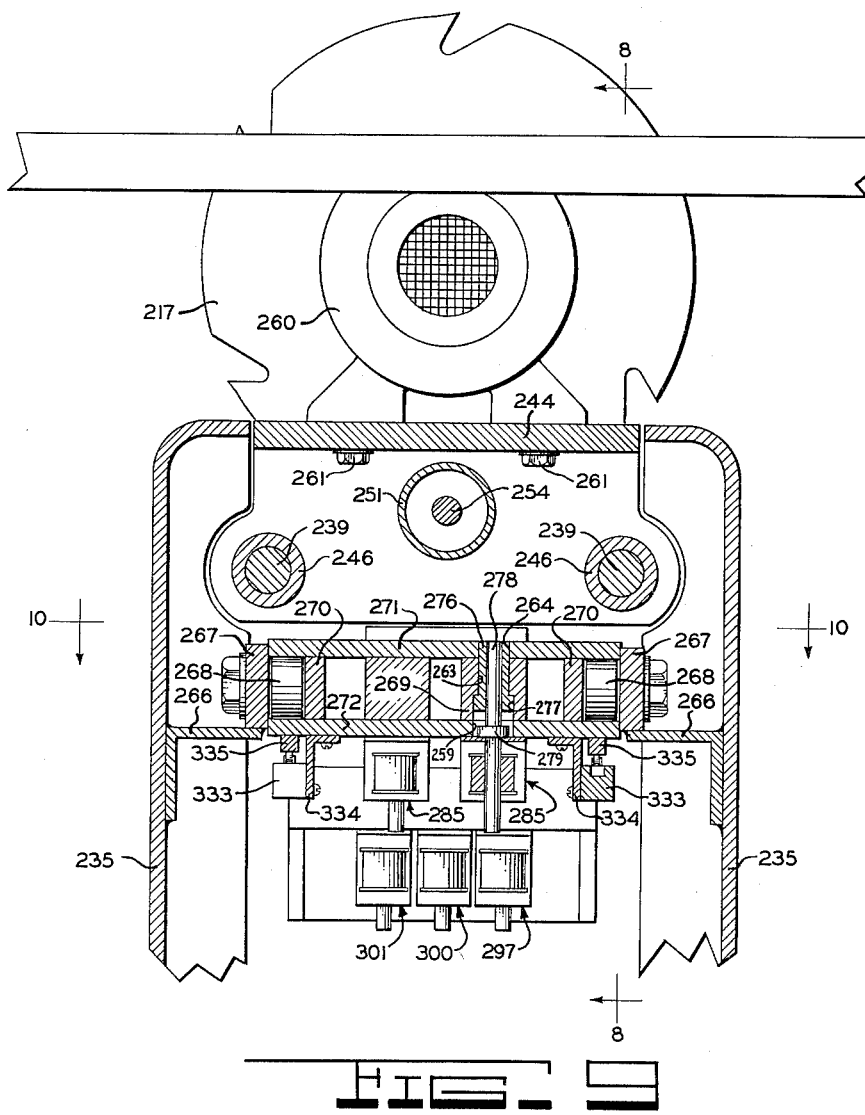

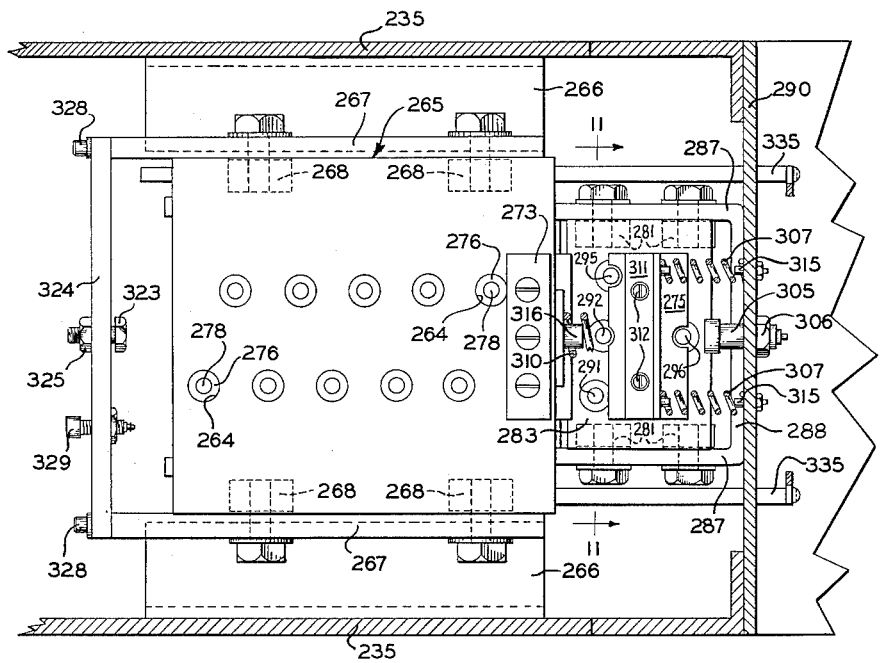
FIG_10
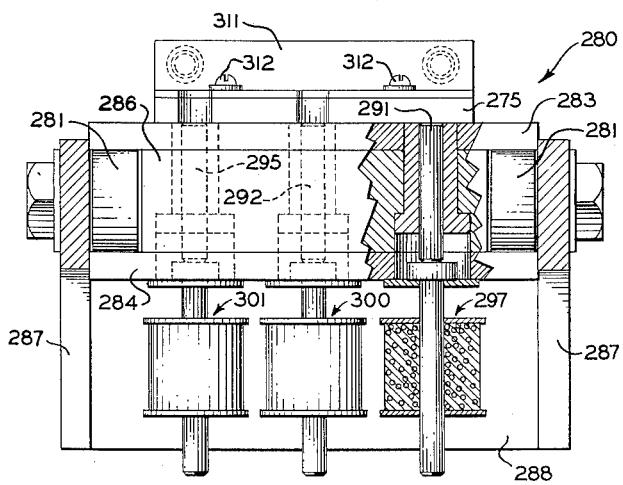
FIG_11

INVENTORS
ORVILLE E. MOWERY
ROBERT G. MILLER

United States Patent Office 2,999,518
Patented Sept. 12, 1961

2,999,518
AUTOMATICALLY ADJUSTABLE GAUGING DEVICE FOR POSITIONING AN ELEMENT
Orville E. Mowery and Robert G. Miller, Wabash, Ind., assignors to The G. M. Diehl Machine Works, Inc., Wabash, Ind., a corporation of Indiana
Filed May 12, 1958, Ser. No. 734,735
16 Claims. (Cl. 143—168)

This invention relates to an adjustable gauging device for positioning an element and may find its primary utility in a sawing machine to locate a saw and a work guide of the sawing machine relative to one another or to locate one saw of the machine relative to another saw of the machine.

One object of the present invention is to provide improved apparatus for positioning an element.

Another object of the present invention is to provide a gauging device in which resilient means are cleverly located to take up the shocks of operation of the device.

A further object of the present invention is to provide an automatic actuating mechanism which so controls the gauging device that it relocates to a newly selected position without excessive movement.

Still another object of the present invention is to provide a positioning device in which the carriages used to give unit and fractional unit positions only move the distances necessary to accomplish their functions.

A further object is to provide automatic means to be used with the device, when it is associated with the guide of a sawing machine, for moving the guide away from the material being sawed as soon as it has been engaged by the sawing machine, whereby the guide does not prevent the sawing machine from producing a straight cut upon other-than-straight-edged material.

Still further objects and advantages will become apparent from the following detailed description.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is a side elevation of guiding apparatus incorporating the elements of our invention;

FIG. 2 is a plan view of the construction shown in FIG. 1 having certain portions thereof broken away for clarity and to conserve space;

FIG. 3 is an end elevation of the apparatus of FIG. 1 having certain portions thereof removed for clarity and having certain portions of a sawing machine depicted to indicate their relationship to the guiding apparatus;

FIG. 4 is a fragmentary, enlarged sectional view taken along the line 4—4 of FIG. 3 and in the directions of the arrows;

FIG. 5 is a further-enlarged sectional view taken along the line 5—5 of FIG. 1 in the direction of the arrows and showing certain details of an inch carriage and a fractional inch carriage which make up important portions of the apparatus of FIG. 1;

FIG. 6 is a schematic representation of an electrical circuit for the embodiment of FIG. 1;

FIG. 7 is a perspective view of a two bladed sawing machine incorporating a second embodiment of our invention;

FIG. 8 is a section taken laterally through the sawing machine of FIG. 7 showing certain details of the second embodiment of our invention, and having certain unimportant portions thereof broken away to conserve space;

FIG. 9 is a fragmentary sectional view taken along the line 9—9 of FIG. 8 in the direction of the arrows;

FIG. 10 is a fragmentary section taken, in the direction of the arrows, along the line 10—10 of FIG. 9 and showing certain details of an inch carriage and a fractional inch carriage which form important portions of the second embodiment of our invention;

FIG. 11 is an enlarged fragmentary section taken along line 11—11 of FIG. 10 in the direction of the arrows and showing certain details of the above-mentioned fractional inch carriage.

Figure 12:
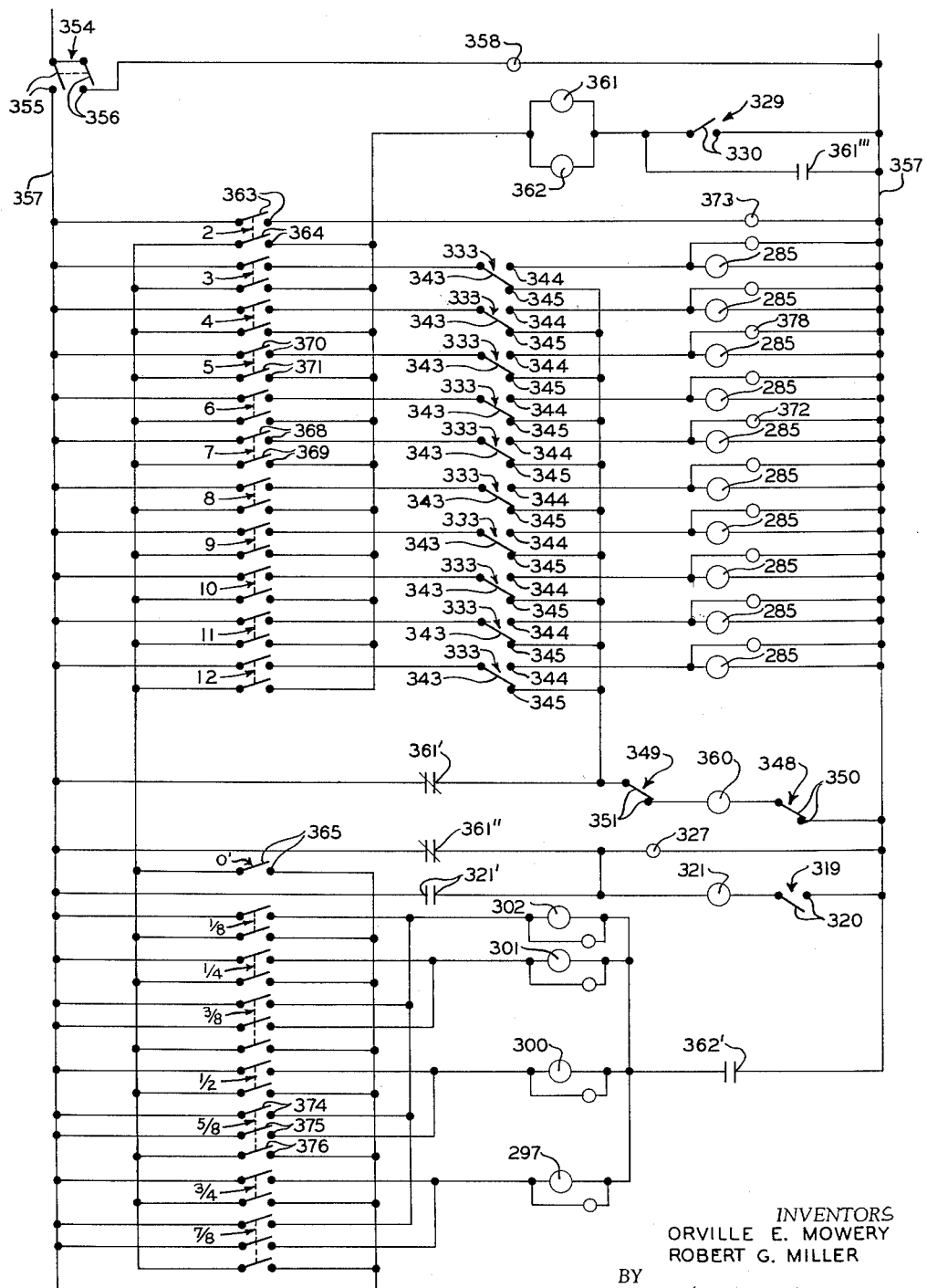
FIG. 12 is a schematic representation of an electrical circuit for the embodiment of FIGS. 7–11.

The present invention may be used with a sawing machine such as that disclosed in the U.S. patent to G. J. Peterson No. 2,714,906. Referring to FIGS. 1–6 of the present disclosure, a guide 15 functions, as does the guide 10 of the Peterson patent, to position a board about to be moved into the sawing machine whereby the board may be cut to any desired width. Referring to FIG. 3 of the present disclosure, the location of the guide 15 is depicted with regard to the work surface 131, the rollers 122 and 123 and the saw blade 124, of such a sawing machine.

The guide 15 is fixed upon a pair of rods 19—19 reciprocably received within collars 13—13, each of which is fixed to a base 14. Each of the rods 19—19 is fixed by one of screws 17—17 to a guide frame or carrier 16 which is generally U-shaped but also has an L-shaped projection 18 extending from the rightward end thereof as viewed in FIG. 1. The guide frame 16 has an abutment 52 fixed to the leftward end thereof by means of bolts 53—53. A pair of frame members 21—21 are fixed to the base 14 and have secured therebetween a frame member 22 from which extends a bored projection 23.

Power means such as a fluid motor 26 is pivotally mounted at the bored projection 23 by means of a clevis 27 extending from the fluid motor 26 and a pin 28. The fluid motor is provided with a piston rod 33 and with fluid conduits 31 and 32 which lead to opposite ends of the fluid motor 26 and through which may be provided fluid under pressure to extend or retract the piston rod 33. The piston rod 33 has a threaded end portion 34 and is fixed to the L-shaped projection 18 of the guide frame 16 by means of nuts 36 and 37. By actuating the fluid motor 26, the guide 15 may be moved leftwardly as viewed in FIGS. 1 and 2 to a position wherein it guides a board to be cut or being cut by a saw or may be moved rightwardly to a retracted position.

An inch carriage indicated generally by the numeral 38 and a fractional inch carriage indicated generally by the numeral 39 function either simultaneously or separately to position the guide 15 at any desired inch or fractional inch setting, respectively. The inch carriage 38 is reciprocable in a leftward or rightward direction as viewed in FIGS. 1 and 2 upon four rollers 41—41 rotatably secured to the frame members 21—21. The inch carriage 38 comprises a top plate 43, a bottom plate 46 and rectangular bars 47 all of which are fixed together by any suitable means to provide a unitary body for the inch carriage 38. When the inch carriage reciprocates, the lower face of its top plate 43 rides along the upwardly-facing portions of the rollers 41—41. A rectangularly shaped abutment 73 and an angle 93 are fixed to the upper left surface of the inch carriage 38. A plurality of solenoids 48—48 (FIGS. 3 and 5) are carried at the lower surface of the bottom plate 46 and are so arranged that each may be energized to extend a respective one of a plurality of stop pins 51—51 (FIG. 5) from the upper surface of the top plate 43; thus constituting positioning means for the respective pins 51—51. The pins 51—51 are so mounted within the carriage 38 that gravity will cause them to drop when their associated solenoids are deenergized.

Referring now to FIG. 5, it can be seen that the pins 51—51 are spaced at equal intervals along the line of movement of, and within, the inch carriage 38. The rightward surfaces of the pins 51—51 are each spaced one inch apart in the direction of movement of the guide frame 16, or, in other words, longitudinally of the complete apparatus. That is, for example, the surface numbered 54 is spaced one inch in such a longitudinal direction from the surface marked 55. Furthermore, the rightward face 59 of the abutment 73 is spaced one inch from the face 60 in the longitudinal direction. For reasons which will hereafter become apparent, the far leftward pin will be referred to as the one inch pin, the second to the far leftward pin as the two inch pin, the third from the far leftward pin as the three inch pin, etc.

The fractional inch carriage 39 is constructed in a similar fashion to the inch carriage 38 and comprises a top plate 57 (FIG. 1) fixed with relation to a bottom plate 58. The fractional inch carriage is reciprocable in the longitudinal direction upon rollers 56—56 which are rotatably mounted within the frame members 21—21. Four solenoids 61, 62, 63 and 66 (FIGS. 5 and 6) are carried by the bottom plate 58 and are arranged so that when energized they will extend the stop pins 67, 68, 71 and 72 respectively from the upper face of the top plate 57. Deenergization of these solenoids will allow their respective pins to drop by gravity back into the fractional inch carriage.

An abutment 76 (FIG. 1) is secured by screws 77—77 to the upper face of the top plate 57 beneath an angle 92 and has cut out portions 75—75 (FIG. 5) adapted to allow the extension of the pins 67, 68 and 71. The rightward faces of the pins 68, 71 and 72 are spaced, respectively, in the longitudinal direction, one-quarter of an inch, one-half of an inch and three-quarters of an inch from the far rightward faces of the abutment 76. The leftward face of the pin 67 is spaced, in the longitudinal direction, one-eighth of an inch from the far leftward faces of the abutment 76.

An abutment 78 has a screw threaded portion 82 threaded within a suitable threaded bore in the frame member 22 and may be locked in any desired position by tightening jam nut 81. The abutment 78 functions to limit leftward movement of the fractional inch carriage 39 by engaging the abutment 76, or by engaging the pin 67 when that pin is extended above the upper surface of the top plate 57.

Assuming that the guide 15 is moved leftwardly by the fluid cylinder 26 from the position of FIG. 1 and further assuming that none of the pins 51—51, 67, 68, 71 and 72 is raised, the guide frame 16 and associated abutment 52 will move leftwardly until the abutment 52 engages the rightward face of the abutment 73. The inch carriage 38 will then be moved leftwardly until the leftward face of the abutment 73 engages the rightward face of the abutment 76. The fractional inch carriage 39 will then be moved leftwardly until the leftward face of the abutment 76 engages the abutment 78. In such a position the guide 15 is fully extended leftwardly as viewed in FIG. 1. This position will be termed the zero position inasmuch as other positions of the guide 15 are determined relative to this zero position. The location of the zero position may be set leftwardly or rightwardly by adjusting the position of the abutment 78 as above described.

Assuming that the apparatus is in the rightward position of FIG. 1 and that it is desired to position the guide 15 a given number of whole inches and a given number of fractional inches from the zero position, the desired number of inches is selected, such as, for example, seven inches and the seven inch pin is extended by means of its respective solenoid 48. Assuming, for example, that five-eighths of an inch of spacing is desired in addition to the seven inches, the one-half inch pin 71 is raised and the one-eighth inch pin 67 is raised. The guide frame 16 is moved leftwardly by means of the fluid cylinder 26 until the abutment 52 engages the seven inch pin and moves the inch carriage leftwardly. The inch carriage moves leftwardly until the abutment 73 engages the raised one-half inch pin causing leftward movement of the fractional inch carriage. The fractional inch carriage is then moved leftwardly until the extended one-eighth inch pin engages the abutment 78. When the apparatus reaches this position, the guide 15 is spaced precisely seven and five-eighths inches rightwardly from the zero position.

Two sets of springs 88—88 and 91—91 (FIGS. 1 and 2) are mounted between the frame member 22 and angle 92 and between the angle 92 and the angle 93, respectively. When the guide 15 is in a retracted position, these springs function to maintain the inch carriage 38 in a rightward position so that the pins 68, 71 and 72 are free to be extended and also to maintain the fractional inch carriage 39 in a rightward position so that the pin 67 is free to be extended. The rightward movement of the fractional inch carriage 39 is limited by means of a pair of rods 96—96 which are mounted in frame member 22 and each of which has an enlarged portion 98 and a screw threaded portion upon which nuts 97—97 are received. These headed rods constitute barrier means for the fractional inch carriage. The limiting position of the fractional inch carriage may be adjusted by manipulation of the nuts 97—97 upon the rods 96—96. The springs 91—91 are retained between angles 92 and 93 by means of the enlarged portions 98—98 and projections 101—101 extending from the angle 93.

The rightward movement of the inch carriage 38 is limited by an adjustable abutment or barrier 102 (FIG. 5) threadedly mounted within frame member 86 and lockable in a desired position by means of jam nut 103. The frame member 86 is fixed to the frame members 21—21 by means of screws 87—87. A pair of limit switches 106 and 107 are mounted within the frame member 86 and when the inch carriage 38 is in a rightward position the switches 106 and 107 are engaged and their contacts 108 and 109 (FIG. 6) are closed.

A plurality of switches 111—111 (FIGS. 3, 4 and 6) are mounted upon angles 114—114 which are secured to the bottom plate 46 of the inch carriage 38. The switches 111—111 are actuated by means of a pair of cam rods 112—112 which are fixed at their left ends to the guide 15 and which are slidably supported by the frame members 22 and 86. The cam rods have camming surfaces 113—113 and 116—116. When one of the surfaces 113 is above a particular switch 111, its contact 117 will engage its contact 118 and when one of the surfaces 116 is above a particular switch 111 its contact 117 will engage its contact 121.

Each of the switches 111 is associated with one of the inch pins 51—51 and, when its contact 121 is engaged by its contact 117, an electrical circuit may be thereby completed, energizing the solenoid 48 associated with its inch pin 51 so as to raise the pin 51. The camming surfaces 116—116 are so located that they do not engage a particular switch 111 until the abutment 52 of the guide frame 16 has passed to the right of the inch pin 51 associated with the particular switch 111.

As has been explained above, the complete positioning apparatus may be used in connection with a sawing machine of the type disclosed in the above-mentioned patent to Peterson. Referring to FIG. 3, the rollers 122 and 123 represent the pressure rollers of such a sawing machine and the surface 131 represents the work surface of such a sawing machine having incorporated therein a feed mechanism (traveling feed belt or the like) for moving the work rightwardly beneath the rollers 122 and 123. An operator holds the lumber to be sawed against the guide 15 and then moves it into engagement with the pressure roller 122 whereby the conventional feed mechanism of the machine engages the lumber and moves it rightwardly as viewed in FIG. 3. As the lumber moves rightwardly, it first raises the pressure roller 123 and then is engaged and cut by the saw 124.

The raising of the pressure roller 123 actuates the switch 126 to cause its contact 127 to engage its contact 129. When there is no lumber in the machine, the pressure roller 123 is in its lower position and the contact 127 of the switch 126 will engage the contact 128. The purpose of the switch 126 is to provide means for sensing the presence or absence of a board in front of the guide 15 and to activate the control mechanism so that the latter moves the guide to a new position according to a previously made selection after a board being cut has passed out of the path of reciprocation of guide 15.

A plurality of push buttons 0 through 12 (FIG. 6) is provided in a suitable control panel (not shown). Each of the buttons 0 through 12 is associated with a particular inch setting of the positioning device. For example, the push button numbered 6 is associated with the six inch pin of the inch carriage 38 and when button 6 is depressed, the solenoid 48 associated with the six inch pin will be energized, assuming, of course, that the corresponding contact 117 is engaging its contact 121. In like manner, each of the push buttons 1 through 5 and 7 through 12 is associated with the respective one of the inch pins which is suggested by its number designation. When the push button 0 is depressed, the positioning device will be operated so that none of the inch buttons will be raised and the abutment 52 will engage the abutment 73 thus giving a zero inch setting as above-described.

A further plurality of push buttons is designated 0′, ⅛, ¼, ⅜, ½, ⅝, ¾ and ⅞. Depression of any of this further plurality of buttons, will result in the fractional inch setting suggested by the designation of the button in a manner to be described below.

Assuming that it is desired to operate the saw and to set the positioning device at a cutting width of 7⅝ inches, an on-off switch, indicated generally by the numeral 130 is thrown to its on position, causing its contacts 132—132 and 133—133 to be closed and to provide a voltage drop between the lines 136 and 137, which in turn causes the signal light 138 to be energized, notifying the operator that the machine is on.

The voltage drop across the lines 136 and 137 causes energization of an air valve solenoid 148 through normally closed contacts 149′—149′ dominated by a solenoid or relay 149 and through contacts 128 and 127 of the pressure roller switch 126. The solenoid 148 is associated with a fluid valve 140 (FIG. 1) and when energized it allows fluid to flow into the conduit 31 causing the piston rod 33 to be extended and the guide 15 to be moved rightwardly as viewed in FIG. 1. When the guide reaches the right-hand end of its stroke, all of the switches 111 are engaged by the sections 116 of the cam rods 112, so that their contacts 117 are closed against their contacts 121.

When the guide is so moved rightwardly, the springs 88 and 91 are allowed to force the fractional inch carriage 39 and the inch carriage 38 rightwardly until the inch carriage engages the switches 106 and 107, causing closing of their contacts 108 and 109. The fluid motor 26 will hold the guide 15 in such a retracted position until one of the inch buttons and one of the fractional inch buttons is depressed. In the case that an inch and fractional inch button are already depressed when the on-off switch is thrown, reference is made to the description of the second embodiment where such operation is described.

The operator depresses the desired inch and fractional inch buttons, for example, button 7 and button ⅝, causing closing of the contacts 141, 142, 143, 144 and 145. The solenoids 149 and 150 are energized from the lines 136 and 137 through the closed contacts 108 of the switch 106, through the contacts 142 of the button 7 and through the contacts 145 of the button ⅝.

Energization of the solenoid 149 causes opening of its normally closed contacts 149′ thus deenergizing the solenoid 148, causing the associated fluid valve 140 to be reversed and fluid to be supplied to the fluid motor 26 through the conduit 32. The fluid motor 26 then moves the guide frame 16 leftwardly.

The closing of the contact 141 of the push button 7 causes energization of the solenoid 48 associated with the seven inch pin through the contacts 117 and 121 of the switch 111 associated with the seven inch pin and also causes energization of a signal light 153 notifying the operator that the seven inch pin is raised. The closing of the contact 143 of the button ⅝ causes energization of solenoid 61 and signal light 154 associated therewith through the closed, normally open contacts 150′ and the solenoid 150. The closing of the contacts 144—144 of the five-eighths inch button energizes the solenoid 63 and associated signal light 155 through the now closed, normally open contacts 150′. Energization of the solenoid 61 and of the solenoid 63 causes raising of the pin 67 (⅛ inch pin) and the pin 71 (½ inch pin) respectively.

As the guide frame 16 moves leftwardly, its abutment 52 engages the seven inch pin causing the inch carriage to move leftwardly, allowing the contacts 108—108 and 109—109 of the switches 106 and 107 to be opened. The opening of the contacts 108 of the switch 106 does not deenergize the solenoids 149 and 150 because normally open contacts 149″—149″ of the solenoid 149 will have been closed by the previous energization of the solenoid 149 locking in the solenoids 149 and 150. The inch carriage 38 moves leftwardly until its abutment 73 engages the one-half inch pin 71 causing the fractional inch carriage 39 to move leftwardly. The fractional inch carriage moves leftwardly until the raised one-eighth inch pin 67 engages the abutment 73 and the guide 15 is positioned precisely 7⅝ inches from the zero position.

The operator may then hold the lumber against the guide 15 while simultaneously moving it beneath the pressure roller 122 at which time the sawing machine will engage the lumber and begin to move it rightwardly as viewed in FIG. 3 toward the saw 124. As the lumber moves rightwardly, it engages the pressure roller 123 causing the contact 127 of the switch 126 to be reversed and to engage the contact 129 of the switch 126.

Now assume that the operator desires to cut the next piece of lumber to a five inch dimension. The apparatus is so constructed that he may press the five inch button before the sawing machine has completed the cutting of the previous board. He presses button 5 of the inch buttons and the 0′ button of the fractional inch buttons. The inch buttons are mechanically interlocked (by conventional means) so that pressing of one will break the contacts of a previously pressed button before the newly pressed button's contacts are made; therefore, pressing the button 5 breaks the contacts 141—141 and 142—142 of button 7 before closing the contacts 158—158 and 159—159 of button 5. Breaking of contacts 141—141 deenergizes signal light 153 and the solenoid 48 associated with the seven inch pin. However, the seven inch pin does not drop because the fluid motor 26 continues to hold guide frame 16 and associated abutment 52 leftwardly against the seven inch pin.

Breaking of contacts 142—142 deenergizes solenoids 149 and 150, closing normally closed contacts 149′—149′ and opening normally open contacts 149″—149″ and 150′—150′. The opening of the contacts 150′—150′ deenergizes the fractional inch solenoids 61 and 63; however, the ⅛ inch pin 67 and the ½ inch pin 71 do not drop because the inch carriage abutment 73 is held in contact with the ½ inch pin 71 and the ⅛ inch pin 67 is held in engagement with the abutment 73 by the fluid motor 26.

The closing of the contacts 158—158 of the button 5 energizes the signal light 163 and the solenoid 48 associated with the 5 inch pin through the contacts 117 and 121 of the switch 111 associated with the 5 inch pin and therefore the 5 inch pin is raised. It will be noted that the 5 inch contact 117 will be contacting the contact 121 because the camming surface 116 of the cam rod 112 will be engaging all of the switches 111 which are to the left of the 7 inch switch 111 as well as the 7 inch switch 111.

In a manner similar to the inch buttons, the fractional inch buttons are mechanically interlocked so that pressing of any given button will release the contacts of any previously pressed fractional inch button before making the contacts of the newly pressed button. Therefore, when the operator presses the 0′ button, he first breaks contacts 143—143, 144—144 and 145—145. The breaking of the contacts 143—143 and 144—144 has no effect inasmuch as the solenoids 61 and 63 have already been deenergized; however, if the operator had pressed the button 0′ before pressing the button 5, the pressing of the button 0′ would have caused this deenergization. The breaking of the contacts 145—145 has no effect because the solenoids 149 and 150 are deenergized. The pressing of the button 0′ also closes its contacts 164—164 which has no effect at this time because the contacts 108 of switch 106 are open.

The board being cut to the 7⅝ inch dimension continues to move rightwardly as viewed in FIG. 3 until the pressure roller 123 drops causing the switch 126 to be reversed, causing the contacts 127 and 129 to be broken, the contacts 127 and 128 to be closed and further causing the solenoid 148 to be energized through the closed, normally-closed contacts 149′—149′. The fluid valve 140 is reversed and the piston rod 33 extends, moving the abutment 52 away from the 7 inch pin and allowing that pin to drop.

The springs 88 and 91 expand moving the inch carriage 38 rightwardly away from the ½ inch pin 71 and also moving the fractional inch carriage 39 away from the abutment 78, thus allowing the pins 71 and 67 to drop into the fractional inch carriage. The fluid motor 26 moves the piston rod 33 rightwardly until the inch carriage 38 engages the switches 106 and 107, closing their contacts 108 and 109. Thus, the guide 15 need only move the short distance necessary to allow the springs 88—88 and 91—91 to expand and to allow the inch carriage and the fractional inch carriage to move to their rightward positions.

The closing of the contacts 108 of the switch 106 energizes the solenoids 149 and 150 through the closed contacts 159—159 of the button 5 and the closed contacts 164—164 of the button 0′. Upon energization of the solenoid 149, the normally closed contacts 149′—149′ are opened, deenergizing the air valve of solenoid 148 thus reversing the fluid motor 26.

The guide frame 16 and associated abutment 52 begin to move leftwardly until the abutment 52 engages the raised 5 inch pin at which time the inch carriage 38 begins to move leftwardly with the guide frame 16. The leftward movement of the inch carriage 38 allows the contacts 108 and 109 of switches 106 and 107 to open; however, the solenoids 149 and 150 are not deenergized because of the locking in of the contacts 149″—149″ of the solenoid 149. Since none of the pins 68, 71 or 72 is in a raised position, the inch carriage 38 moves leftwardly until its abutment 73 engages the abutment 76 whereupon the fractional inch carriage begins to move with the inch carriage. The pin 67 is not raised and therefore the fractional inch carriage will be moved leftwardly until its abutment 76 engages the abutment 78 at which time the guide 15 will be positioned precisely five inches from the zero position. The operator may now insert a board into the sawing machine in the usual manner.

Assuming now that the operator decides that instead of exactly 5 inches, he wants 5¼ inches, he then presses the button ¼, whereby the contacts 164 of the button 0′ are broken, causing deenergization of the solenoids 149 and 150. The contacts 149′ close and cause energization of the air valve of solenoid 148 through the closed contacts 127 and 128 of the pressure roller switch 126 (assuming no lumber in the machine). The fluid motor 26 is reversed and the guide frame 16 and associated abutment 52 begin to move rightwardly. The inch carriage 38 and fractional inch carriage 39 move rightwardly until the inch carriage engages the switches 106 and 107 and closes their respective contacts 108—108 and 109—109.

The closing of the contacts 108 energizes the solenoids 149 and 150 through the closed contacts 159 and 168, resulting in closing of the normally open contacts 150′—150′ of solenoid 150 and also resulting in the energization of the solenoid 62 and signal light 169 through the now closed contacts 167 of the button ¼. The energization of the solenoid 62 causes raising of the ¼ inch pin 68. It should be noted that to allow this adjustment, the guide 15 is only retracted the short distance necessary to allow the inch carriage to actuate switch 106.

The air valve of solenoid 148 is now deenergized by the opening of normally closed contacts 149′—149′ of the solenoid 149 and the fluid motor 26 begins to move the guide frame 16 leftwardly again. The guide frame 16 moves leftwardly until its associated abutment engages the still raised 5 inch pin at which time the inch carriage 38 begins to move leftwardly with the guide frame 16. The inch carriage 38 moves leftwardly until its abutment 73 engages the raised ¼ inch pin 68, causing the fractional inch carriage 39 to begin leftward movement. The fractional inch carriage 39 is moved leftwardly until its abutment 76 engages the abutment 78 at which time the guide will be positioned exactly 5¼ inches from the zero position.

Without going into further details of the operation, it can be seen that pressing of any of the inch buttons or the fractional inch buttons will cause the positioning apparatus to set the guide at the desired position as soon as the board which is in the machine has passed the roller 123 or, if there is no lumber in the machine, that the positioning device will react instantly to set the guide 15 at the desired position. Without going into further detail with regard to the inch buttons, it can be seen that pressing of any inch button associated with a greater dimension than the previously pressed inch button will cause the guide frame 16 and associated abutment 52 to be moved rightwardly until the particular inch pin desired is free to be raised and is raised. This is true because the switch 111 associated with the desired inch pin will have its contact 117 in engagement with its contact 118 until the abutment 52 passes to the right of its associated inch pin.

In such a situation the air valve solenoid 148 is maintained energized through the switch 111 and the contacts of the button for the particular inch setting desired, since it will be seen that those contacts establish a circuit through switch contact 118 which by-passes contacts 149′ to maintain energization of solenoid 148. When the abutment 52 moves to the right of the inch pin desired, the contacts of the particular switch 111 are reversed, thus deenergizing the air valve of solenoid 148 and simultaneously energizing the particular solenoid 48 associated with the desired inch pin, raising the inch pin.

In case the inch pin setting desired is of a lesser dimension than the previous inch setting of the device, there is no problem and the particular inch pin is free to be raised without first moving the abutment 52 to the right of such an inch pin. In such a situation the guide 15 need only be retracted a sufficient distance to allow the engaged inch pin to drop or, in other words, only a sufficient distance to allow the inch carriage to abut abutment 102.

It can be seen that pressing of any of the fractional inch pins while the guide is at a given guiding position will cause the inch carriage 38 to be moved rightwardly until it actuates the switch 106 at which time the solenoid 150 is energized closing its contacts 150′ and allowing the particular combination of fractional pins selected to be raised by their respective solenoids. The arrangement of the fractional inch electrical circuit and its operation becomes obvious when one notes that the ⅛ inch, ⅜ inch, ⅝ inch and ⅞ inch positions are merely 0 inches plus ⅛ inch, ¼ inch plus ⅛ inch, ½ inch plus ⅛ inch and ¾ inch plus ⅛ inch, respectively.

Another switch 170 is provided on the control panel for operating apparatus which will move the guide 15 away from the board after the board has been engaged by the sawing machine. Such an attachment is advantageous because it allows the sawing machine to make a true cut in the board without the board becoming misaligned because of any rough or warped edge stock engaging the guide 15. When the yield switch 170 has its contacts 171 closed the positioning of the guide 15 takes place in the same manner as has been described above. However, when the board being cut raises the second pressure roller 123 the switch 126 is reversed causing the contact 127 to engage the contact 129 resulting in energization of a solenoid 172, the solenoid 172 then closes its normally open contacts 172'—172' energizing the air valve solenoid 148 through the also now closed contacts 172" of the solenoid 172. The fluid motor 26 moves the piston rod 33 rightwardly until the inch carriage 38 engages the switches 106 and 107 closing the contacts 108 and 109. The closing of the contacts 109 energizes a solenoid 173 through closed contacts 171—171 and the contacts 127 and 129. Solenoid 173 is arranged to close a valve 174 (FIG. 1) shutting off the fluid supply to the fluid valve and to the fluid motor 26, thus preventing the leftward movement of the guide 15.

The board continues to move rightwardly as viewed in FIG. 3 until it passes the second pressure roller 123 thus allowing the switch 126 to reverse its contacts and the contacts 127 and 129 to be broken. Assuming that no new fractional inch or inch button has been pressed, the stop fluid valve 174 of solenoid 173 being deenergized and the air valve solenoid 148 also being deenergized will result in the fluid motor 26 returning the guide 15 to its previous inch and/or fractional inch setting.

A second embodiment of our invention is incorporated within a sawing machine of the type depicted in FIG. 7, having two saw blades located in a parallel relation. Lumber to be sawed is held by the operator against an adjustable guide 220 as it is moved by the operator between the pressure roller 222 and the most rightward one, as viewed in FIG. 7, of a plurality of drive rollers 221—221. The work is then moved leftwardly by the drive rollers 221—221 between the drive rollers 221—221 and the pressure rollers 222, 223, 224 and 225 and is sawed longitudinally by saw blades 216 and 217. The saw blade 216 is, of course, movable rotatably but is not movable transversely; however, the guide 220 is adjustable transversely with respect to the blade 216 to vary the cut width of the portion of the board between the plane of the guide 220 and the plane of the saw blade 216. The guide 220 may be of a type adjusted manually or of a type adjusted automatically by means of the positioning device comprising our first embodiment. The saw blade 217 is adjustable transversely toward and away from the saw blade 216 so as to vary the cut width of the portion of the board between the planes of the saw blades 216 and 217.

The saw blade 216 is rotated by a conventional electrical saw motor 230 (FIG. 8) which is mounted upon frame member 231. Support members 232 and 233 are fixed to frame members 235—235 (FIG. 9) by means of screws 234—234 (FIGURE 8). Two saw carriage support rods 239—239 are supported by the support member 232 and a frame member 236 and are held in place by set screws 240—240.

A saw carriage, indicated generally by the numeral 243, is slidably mounted upon the support rods 239—239 and may be moved along the rods 239—239 by means of a fluid motor 251 to position the saw blade 217 relative to the saw blade 216. The saw carriage 243 includes a base plate 244, vertical members 245 and 247 fixed to the base plate 244, and two cylinders 246—246 fixed to and between the vertical members 245 and 247. Each of the cylinders 246—246 is slidably received upon a respective one of the rods 239—239 so as to provide the slidable support for the saw carriage 243.

A bored projection 250 extends from the support member 233 and provides a pivotal mounting for the fluid motor 251 which is connected to the bored projection 250 by means of a pin 253 and a clevis 252 fixed to the end of the fluid motor 251. The fluid motor has a piston rod 254 fixed to the vertical member 247 of the saw carriage 243 by means of nuts 255—255 threaded upon the screw threaded end 256 of the piston rod 254. The saw blade 217 is powered by a conventional electric motor 260 fixed by screws 261—261 to the base plate 244 and having a shaft 262 upon which the saw blade 217 is conventionally mounted.

It can be seen that by actuating the fluid motor to retract the piston rod 254 the saw blade 217 will be moved leftwardly as viewed in FIGS. 8 and 10, and by actuating the fluid motor 251 to extend the piston rod 254 the saw blade 217 will be moved rightwardly. The saw blade 217 is set at a desired position by actuating the fluid motor to move the saw carriage 243 rightwardly until motion is stopped by the combined action of an inch carriage, indicated generally at 265, a fractional inch carriage, indicated generally at 280, and an abutment 305.

The inch carriage 265 is reciprocable longitudinally of the rods 239—239 upon rollers 268—268 which are rotatably mounted upon carriage mount members 267—267 (FIG. 9). The carriage mount members 267—267 are fixed to angles 266—266 which, in turn, are fixed to the inside surfaces of the frame members 235—235. The inch carriage 265 includes a top plate 271, a pair of rectangular bars 269—269 fixed to the top plate 271, a pair of spacers 270—270 fixed to the top plate 271, and a bottom plate 272 fixed to spacers 270—270 and rectangular bars 269—269. The rectangular bars 269—269 have a plurality of bores 263—263 therethrough which are aligned with bores 264—264 in the top plate 271 and with bores 259—259 in the bottom plate 272. The bores 263—263 are counterbored as at 277 for press-fit reception of inserts 276—276 each of which has a stop pin 278 reciprocably received therein.

The pins 278—278 have enlarged portions 279—279 which limit the upward movement of the pins 278—278 by engaging the lower surfaces of the inserts 276 and which limit the downward movement of the pins 278—278 by engaging the upper surfaces of conventional solenoids 285—285. The solenoids 285—285, which are carried by the bottom plate 272, are arranged so that when energized each will actuate its respective pin 278 to an upward position wherein the enlarged portion 279 abuts the insert 276 and the upper end of the pin extends above the top plate 271. When any one of the solenoids 285 is deenergized, its respective pin 278 is free to drop into the inch carriage 265, assuming that it is not being held in an upward position by the vertical member 245 (FIG. 8) of the saw carriage 243 pressing thereagainst. The details of the solenoids 285—285 will not be described inasmuch as they are conventional, commercially available items.

Referring to FIG. 10, it can be seen that the pins 278—278 are spaced at equal intervals in the longitudinal direction and that the leftward face of the far rightward pin is spaced an equal interval from an abutment 273 fixed to the upper rightward end of the inch carriage 265. In order to position the saw carriage 243 at various inch settings, it is moved rightwardly until its vertical member 245 engages a raised one of the pins 278—278 or the leftward surface of the abutment 273. Thus it should be obvious that the leftward surfaces of the pins must be spaced an inch apart in the longitudinal direction and the leftward surface of the abutment 273 must be spaced, in the longitudinal direction, one inch from the leftward surface of the far rightward pin 278. For reasons that if not now obvious will become obvious, the far rightward pin 278 will be referred to as the three inch pin, the next to the far rightward pin 278 as the four inch pin, the third from the far rightward pin as the five inch pin, etc.

The fractional inch carriage 280 is reciprocable in the longitudinal direction between a pair of projecting arms 287—287 of a somewhat U-shaped member 288 which is fixed to the frame member 290. The projecting arms 287—287 have rollers 281—281 rotatably mounted therein upon which the fractional inch carriage 280 reciprocates. The fractional inch carriage comprises top plate 283 (FIG. 11), intermediate member 286 fixed thereto, and bottom plate 284 fixed to the intermediate member 286. Pins 291, 292, 295 and 296 are reciprocably mounted in the fractional inch carriage in the same manner in which the pins 278—278 are mounted in the inch carriage 265 and therefore the details of their mounting will not be repeated. Solenoids 297, 300, 301 and 302 (the last shown only in FIG. 12) are carried by the bottom plate 284 and are arranged to raise the pins 291, 292, 295 and 296, respectively, when the respective solenoids are energized. Assuming that the abutments 274 (FIG. 8) and 305 are not holding any of the pins 291, 292, 295 and 296 up by being pressed against the pins, the pins will be dropped by gravity upon deenergization of their solenoids.

Abutment 274 is fixed to the lower rightward surface of the bottom plate 272 of the inch carriage 265. Fractional inch settings of the saw blade 217 of ¼, ½ and ¾ inch are accomplished by the engagement of the abutment 274 with the leftward surfaces of the pins 295, 292 and 291, respectively. No fractional setting or, in other words, a fractional inch setting of 0 is provided by the engagement of the abutment 274 with the leftward surfaces of an abutment 275 fixed to the top plate 283 of the fractional inch carriage 280. The abutment 275 is so shaped that the pins 292, 295 and 296 may be raised without interference with the abutment 275 (see FIG. 10).

In order to provide the above-mentioned fractional inch settings the most leftward portions of the pins 291, 292 and 295 are spaced respectively ¾, ½ and ¼ inch from the far leftward faces of the abutment 275. The pin 296, which is provided to make possible fractional inch settings of ⅛, ⅜, ⅝ and ⅞ inch, has its rightward face spaced ⅛ of an inch rightwardly of the far rightward faces of the abutment 275. The abutment 305 is threaded within a suitable aperture in the frame member 290 and may be locked in any desired position by adjustment nut 306. The abutment 305 provides a stop which will engage either the raised ⅛ inch pin 296 or the rightward faces of the abutment 275 when the fractional inch carriage is forced rightwardly by the abutment 274 of the inch carriage 265.

Springs 307—307 and 310 are provided for yieldably maintaining the fractional inch carriage 280 and the inch carriage 265 in leftward positions when these carriages are not moved rightwardly by the action of the fluid motor 251. The springs 307—307 act on the fractional inch carriage 280 through an angle 311 fixed to the fractional inch carriage by screws 312—312 and are retained in place by projecting members 315—315 fixed to the frame member 290 and by similar studs carried by the angle 311. Spring 310 is retained in place by lugs 316 and 317 fixed to the inch carriage 265 and the frame member 290, respectively. When the springs 307—307 and 310 are at their extended positions the pins 291, 292, 295 and 296 have no abutments above them and are free to be extended.

The leftward movement of the fractional inch carriage is limited by the stop member 318 (FIG. 8) which is fixed to the projecting arms 287—287 of the U-shaped member 288. A switch 319, which is mounted in the stop member 318, is actuated by the fractional inch carriage, when in the leftward position, so as to close its contacts 320—320 (FIG. 12). The leftward movement of the inch carriage 265 is limited by an abutment 323 (FIG. 10) threadedly mounted within a back carriage member 324 and lockable in any desired position by a nut 325. The back carriage member 324 is fixed to the carriage mount members 267—267 by screws 328—328 and has a switch 329 mounted therein. When the inch carriage 265 is in a leftward position, as viewed in FIGS. 8 and 10, the switch 329 is actuated to close its contacts 330—330 (FIGURE 12). It should be noted that the allowable travel of the inch carriage 265 is greater than that of the fractional inch carriage 280 and, therefore, when the two carriages are moving leftwardly together under the action of their springs 307—307 and 310 the fractional inch carriage 280 will be the first to reach the limit of its travel.

A plurality of limit switches 333—333 (FIGS. 8 and 9) is fixed below and relative to the bottom plate 272 of the inch carriage 265 by means of angles 334—334. A pair of cam rods 335—335 is fixed to the vertical member 247 of the saw carriage 243 by means of rigid straps 338—338 and when the saw carriage 243 reciprocates on the support rods 239 the cam rods 335 also move with the saw carriage 243. The cam rods 335—335 have camming surfaces 339—339 and 340—340. When one of the surfaces 339—339 engages one of the plurality of limit switches 333—333, the contacts 343 and 344 (FIG. 12) of the limit switch will be closed. When one of the surfaces 340—340 engages one of the limit switches 333—333 or when either cam rod disengages such switch, the contacts 343 and 345 of the limit switch will be closed.

The limit switches 333—333 are each associated with a respective one of the solenoids 285—285 and of the inch pins 278—278. The switches 333—333 are spaced along the angles 334—334 at such locations that they will not allow energization of the particular solenoid 285 with which a given switch 333 is associated unless the vertical member 245 is located to the left of the particular pin 278 with which the given switch 333 is associated.

Referring again to FIG. 7, the pressure rollers 222 and 224 have switches 348 and 349 (FIG. 12) associated respectively therewith. When a board is introduced into the machine, it raises the roller 222 causing actuation of its switch 348, to open its contacts 350—350. In like manner, when roller 224 is raised, its contacts 351—351 will be opened. When either of these rollers is in a lowered position the contacts of its switch will be closed.

Referring to FIG. 12, it should be noted that each solenoid 285 and each of the solenoids 297, 300, 301 and 302 is provided with a signal light, for example, signal lights 372 and 378 which are associated with the 7 inch pin and the 5 inch pin, respectively. Whenever one of the solenoids is energized, its signal light is also energized, thus notifying the operator that its associated pin is raised.

Assuming that the operator wishes to saw a piece of lumber into three widths, he first adjusts the position of the adjustable guide 220 manually or, if the guide is of the automatic type described in the first portion of this specification, in the manner above-described, thus determining the width of the section between the planes of the guide 220 and the saw blade 216. The operator starts the saw blade positioning means by throwing a switch 354, closing its contacts 355—355 and 356—356 placing a voltage drop across the lines 357—357 and thus energizing signal light 358.

When a solenoid 360 is energized it actuates a fluid valve similar to the valve 140 of FIG. 1 to allow fluid under pressure to be supplied to the right end of the fluid motor 251 thus causing the piston 254 of the fluid motor to be retracted and further causing the saw carriage 243 and associated saw blade 217 to be moved leftwardly. Since the contacts 351—351 and 350—350 of the pressure roller switches 349 and 348, respectively, are closed because there is no lumber in the machine, closure of the switch 254 immediately energizes the solenoid 360 through the normally closed contacts 361'—361' of the solenoid 361 and therefore the saw carriage 243 is moved leftwardly.

The closing of contacts 355—355 of the switch 354 also causes energization of a signal light 327 through the normally closed contacts 361"—361" of the solenoid 361. The function of this light is to notify the operator, by the fact that it is deenergized, when the machine is in position and ready for lumber to be inserted between the pressure rollers and the drive rollers. When the light is on, the operator is notified not to place lumber into the machine.

The inch carriage 265 and the fractional inch carriage 280 are allowed to move leftwardly under the action of the springs 307—307 and 310 until the fractional inch carriage reaches the end of its travel actuating the switch 319 to close its contacts 320—320 energizing solenoid 321 closing its contacts 321'—321' to hold an energizing circuit for solenoid 321 independent of contacts 361"—361". The saw carriage 243 and the inch carriage 265 continue their leftward movement until the inch carriage reaches the end of its travel actuating the switch 329 to close its contacts 330—330.

A plurality of push buttons designated by their inch and fractional inch values are provided in a suitable control panel for controlling the positioning apparatus. The inch buttons, which are designated 2 through 12, are mechanically interlocked so that when one of the buttons is pressed, the contacts of any previously pressed button will be broken before the contacts of the newly pressed button are closed. The contacts of the fractional inch buttons which are designated 0', ⅛, ¼, ⅜, ½, ⅝, ¾, and ⅞, are also mechanically interlocked in a similar fashion so that pressing of any of the fractional inch buttons will break the contacts of any previously pressed fractional inch button before closing the contacts of the newly pressed fractional inch button.

Obviously, in the normal situation, one of the inch buttons and one of the fractional inch buttons will be depressed at the time the switch 354 is thrown because of previous operation of the machine. Assuming, however, for the moment that none of the inch or fractional inch buttons is depressed, the saw carriage 243 will continue leftward movement until it reaches the limit of its travel. Assuming the more usual situation, that an inch and a fractional inch button are depressed when switch 354 is thrown, for example buttons 5 and 0', solenoids 361 and 362 will be energized when the inch carriage 265 actuates the switch 329 because a circuit will be completed through contacts 330—330, the solenoids, contacts 371—371 and contacts 365—365.

Energization of the solenoids 361 and 362 will open normally closed contacts 361'—361' and 361"—361" and will close normally open contacts 361'''—361''' and 362'—362'. The opening of the contacts 361"—361" does not deenergize signal light 327 because it is maintained energized through the closed contacts 321'—321' of the solenoid 321. Whether or not the solenoid 360 is deenergized by the opening of the contacts 361'—361' depends upon the position of the saw carriage 243 and its associated cam rods 335 with relation to the switches 333—333 of the inch carriage.

Assuming that the 5 inch pin is still raised from previous operation of the device, the solenoid 360 will be deenergized and will reverse the movement of the saw carriage. If the 5 inch pin is not raised and the vertical member 245 is over or to the right of the 5 inch pin, the solenoid 360 will remain energized, through the contacts 370—370 of the button 5, contacts 343 and 345 of switch 333 associated with the 5 inch pin and contacts 351—351 and 350—350 of switches 349 and 348, until the cam portion 339 of a cam rod 335 engages the switch 33 associated with button 5 to reverse that switch, closing contacts 343 and 344 thereof and energizing signal light 378 and a solenoid 285 to raise the 5 inch pin. It will be clear that this action cannot occur unless and until the vertical member 245 assumes a position to the left of the 5 inch pin.

Upon such deenergization of solenoid 360, the saw carriage will be moved rightwardly by fluid motor 251 causing the vertical member 245 to engage the elevated 5 inch pin and move the inch carriage 265 rightwardly. Even though the contacts 330—330 of switch 329 open when the inch carriage moves away from the switch, the solenoids 361 and 362 remain energized through locked in contacts 361'''—361''' of solenoid 361. The inch carriage will move rightwardly until abutment 274 engages abutment 275 to move the fractional inch carriage rightwardly. The rightward movement of the fractional inch carriage opens switch 319 deenergizing signal light 327 notifying the operator that no further steps are necessary to positioning of the saw blade. The fractional inch carriage will move until the abutment 275 engages the abutment 305 stopping all of the carriages in a "5 inch position" in which the saw blade 217 is 5 inches from saw blade 216.

Assume that the operator desires a 2 inch setting between the saw blades. He presses the button 2 breaking the contacts 370—370 and 371—371 before closing contacts 363—363 and 364—364. Closure of contacts 363—363 energizes signal light 373. The breaking of the contacts 370—370 causes deenergization of the solenoids 361 and 362 causing the contacts 361'—361' to close and to result in energization of solenoid 360 through contacts 351—351 and 350—350 of switches 349 and 348. Deenergization of the solenoids 361 and 362 also closes contacts 361"—361", energizing the signal light 327, and further opens contacts 361'''—361''' and 362'—362'.

The solenoid 360 reverses the fluid valve, supplying fluid to the right end of the fluid motor 251 and causing the saw carriage to be moved leftwardly. The saw carriage 243 moves leftwardly until switch 319 is actuated by the fractional inch carriage to close its contacts 320—320 energizing solenoid 321 to close contacts 321'—321'. The saw carriage continues to move leftwardly until the inch carriage 265 engages abutment 323 and the 5 inch pin is dropped, the solenoid 285 associated with the 5 inch pin having been deenergized by the breaking of contacts 370—370. The inch carriage upon reaching the limit of its travel also actuates switch 329 to close its contacts 330—330.

The solenoids 361 and 362 are energized through the now closed contacts 364—364 of the button 2, the contacts 365—365 of the button 0' and through the closed contacts 330—330 of the limit switch 329 causing locking in of contacts 361'''—361'''. The energization of the solenoid 361 also causes breaking of its normally closed contacts 361'—361' deenergizing the fluid valve of solenoid 360 and causing fluid to be supplied to the left end of the fluid motor 251 causing the saw carriage 243 to be moved rightwardly. Energization of solenoid 361 also opens contacts 361"—361" but signal light 327 remains energized through the contacts 321'—321'.

The saw carriage 243 moves rightwardly until its vertical member 245 engages the left side of the abutment 273 at which time the inch carriage 265 begins to move rightwardly with the saw carriage 243. The inch carriage 265 moves rightwardly until its abutment 274 engages the leftward faces of the abutment 275 thus causing the fractional inch carriage 280 to move rightwardly. As the fractional inch carriage moves to its rightward position the signal light 327 is deenergized by opening of contacts 320—320 of switch 319 causing opening of contacts 321'—321' of solenoid 321. The fractional inch carriage moves rightwardly until its abutment 275 engages the abutment 305 thus stopping movement of the saw carriage, inch carriage and fractional inch carriage and positioning the saw blade 217 exactly two inches from the saw blade 216.

Let us assume that the operator decides he wants a 7 inch setting between the blades 216 and 217 instead of the 2 inch setting. He presses the button 7 causing opening of the contacts 363—363 and 364—364 before closing of the contacts 368—368 and 369—369. The opening of the contacts 363—363 extinguishes the signal light 373, while the opening of contacts 364—364 deenergizes the solenoids 361 and 362 causing the contacts 361'—361' to close and to allow energization of the solenoid 360 and also causing contacts 361"—361" to close energizing signal light 327. Energization of the solenoid 360 results in fluid being supplied to the rightward end of the fluid motor 251 causing the piston rod 254 to be retracted and to move the saw carriage 243 leftwardly.

As the saw carriage 243 moves leftwardly it allows the fractional inch carriage to move to the limit of its travel actuating switch 319 to close its contacts 320—320 energizing the solenoid 321 to close its contacts 321'—321'. Next the inch carriage reaches the limit of its travel closing the contacts 330—330 of the switch 329 and energizing the solenoids 361 and 362 through contacts 369—369. The energization of solenoid 361 opens the contacts 361'—361' but does not deenergize the solenoid 360 because of the circuit through contacts 368—368, contacts 343 and 345 of switch 333 associated with the seven inch button, contacts 351—351 of switch 349, solenoid 360 and contacts 350 of switch 348. Energization of the solenoids 361 and 362 also opens the normally closed contacts 361"—361" and closes contacts 362'—362' which has no effect at this time. The contacts 361'''—361''' of the solenoid 361 close locking in solenoids 360 and 361.

The saw carriage 243 continues to move leftwardly until the vertical member 245 has passed beyond or leftwardly of the 7 inch pin. At this time one of the cam rods 335 will actuate the limit switch 333 associated with the 7 inch pin so as to open its contacts 343 and 345 and close the contacts 343 and 344 thus causing energization of signal light 372 and of the solenoid 285 associated with the 7 inch pin. The opening of the contacts 343 and 345 also causes deenergization of the solenoid 360 reversing the fluid being supplied to the fluid motor 251 thus causing the saw carriage 243 to be moved rightwardly.

The saw carriage 243 moves rightwardly until the vertical member 245 engages the raised 7 inch pin at which time the inch carriage 265 begins to move rightwardly with the saw carriage 243. Inasmuch as none of the pins 291, 292 or 295 is raised, the inch carriage moves rightwardly until the abutment 274 engages the leftward faces of the abutment 275. The fractional inch carriage is then moved rightwardly by the inch carriage until the rightward face of the abutment 275 engages the abutment 305 thus positioning the saw blade 217 exactly 7 inches from the saw blade 216. When the fractional inch carriage moves away from the switch 319 its contacts 320—320 open deenergizing solenoid 321, opening contacts 321'—321' and deenergizing signal light 327.

Assume now that the operator inserts the lumber to be sawed into the sawing machine guiding it by means of the guide 220 while moving it leftwardly as viewed in FIG. 7, until it is engaged by the guide rollers 221 and moved leftwardly under the power of the drive rollers 221—221. The pressure roller 222 will be moved upwardly thus causing the contacts 350—350 of the pressure roller switch 348 to be opened. The opening of the contacts 350—350 prevents the solenoid 360 from being energized while lumber in the machine is holding the pressure roller 222 upwardly. The contacts 351—351 of the switch 349 associated with pressure roller 224 have a similar function and therefore the saw blade 217 may not be moved from a previously set position while there is lumber being sawed in the machine.

Assuming that while the lumber in the machine is being sawed to the desired 7 inch width, the operator desires to set the machine to cut the next piece of lumber to a 5 inch dimension. He presses the button 5 breaking the contacts 368—368 and 369—369 before closing the contacts 370—370 and 371—371. The breaking of the contacts 369—369 causes deenergization of the solenoids 361 and 362 thus closing the contacts 361'—361' and 361"—361". Light 327 is energized through the contacts 361"—361" notifying the operator to insert no further lumber in the machine until positioning is complete. Because the vertical member 245 is to the left of the 5 inch pin, the contacts 343 and 344 of the limit switch 333 associated with the 5 inch button are closed. Therefore a signal light 378 is energized and the solenoid 285 associated with the 5 inch pin is energized causing the 5 inch pin to be raised.

As long as the lumber is in the machine causing either of the contacts 351—351 or the contacts 350—350 to be open, the solenoid 360 cannot be energized so as to cause the fluid motor 251 to reverse the force on the saw carriage and to move the saw blade 217 leftwardly. However, as soon as the lumber leaves the pressure roller 224, the contacts 351—351 of the switch 349 will be closed and the solenoid 360 will be energized causing the saw carriage 243 to be moved leftwardly by the fluid motor 251.

The saw carriage, inch carriage and fractional inch carriage move leftwardly until the fractional inch carriage reaches the limit of its travel actuating the switch 319 to close contacts 320—320, energizing solenoid 321 so as to close contacts 321'—321'. The saw carriage and inch carriage move leftwardly until the inch carriage reaches abutment 323 and allows the 7 inch pin to drop. The inch carriage also engages the switch 329 closing its contacts and energizing solenoids 361 and 362. The energization of the solenoid 361 opens its contacts 361'—361' deenergizing solenoid 360 to reverse the fluid supply to fluid motor 251. Energization of the solenoids 361 and 362 also opens contacts 361"—361" and closes contacts 362'—362' which has no effect at this time.

The fluid motor 251 then begins to extend its piston rod 254 causing the saw carriage 243 to be moved rightwardly until the saw carriage engages the now raised 5 inch pin. The inch carriage 265 is moved rightwardly by the vertical member 245 of the saw carriage until its abutment 274 engages the abutment 275 of the fractional inch carriage 280. As the fractional inch carriage moves away from the switch 319, its contacts 320—320 are opened deenergizing solenoid 321, opening its contacts 321'—321' and deenergizing signal light 327. The fractional inch carriage is then moved rightwardly until its abutment 275 engages the abutment 305 at which time the saw blade 271 will be positioned at precisely the desired 5 inch setting.

Let us assume that the operator decides that he wants a 5⅝ inch setting instead of a 5 inch setting. He presses the ⅝ inch button causing breaking of the contacts 365—365 of the button 0' before closing the contacts 374—374, 375—375 and 376—376 of the button ⅝. The breaking of the contacts 365—365 deenergizes the solenoids 361 and 362 thus opening their contacts 361'''—361''' and 362'—362' and closing the contacts 361'—361' and 361"—361". The closing of the contacts 361'—361' energizes the solenoid 360 causing the fluid motor to move the saw carriage leftwardly. The signal light 327 is energized by the closing of the contacts 361"—361".

The carriages move leftwardly until the fractional inch carriage engages switch 319, energizing solenoid 321 and closing contacts 321'—321'. The inch and saw carriages move leftwardly until the inch carriage engages the switch 329 and closes the switch and contacts 330—330. The solenoids 361 and 362 are thereby energized, closing contacts 361'''—361''' and 362'—362' and opening contacts 361'—361' and 361"—361".

The closing of the contacts 362'—362' energizes the solenoids 300 and 302 through the closed contacts 375—375 and 374—374, respectively. It will be remembered that the solenoids 300 and 302 are associated with the ½ and ⅛ inch pins 292 and 296, respectively, so that energization of these solenoids raises their respective pins. Because of the contacts 362'—362' none of the fractional inch pins will be raised until the inch and fractional inch carriages have moved to the leftward ends of their travel thus preventing interference of the abutments 274 and 305 with the raising of these pins.

The opening of the contacts 361'—361' deenergizes the solenoid 360 thus reversing the fluid valve associated therewith to reverse the force of the fluid motor 251. The saw carriage 243 moves rightwardly until it engages the still raised 5 inch pin, at which time the inch carriage 265 moves rightwardly away from the switch 329. Switch 329 is actuated to open its contacts 330—330 which has no effect because solenoids 361 and 362 are locked in through the contacts 361'''—361''' of solenoid 361'. The inch carriage is moved rightwardly until its abutment 274 engages the raised ½ inch pin 292 causing the fractional inch carriage to move rightwardly.

The switch 319 is released opening the contacts 320—320 causing deenergization of the signal light 327 as a result of opening of the contacts 321'—321' of solenoid 321. All of the carriages move rightwardly until the raised ⅛ inch pin 296 engages the abutment 305 stopping movement of the carriages and positioning the saw blade 217 at precisely 5⅝ inches from the saw blade 216.

Without describing further details of the operation of each inch setting, it can be seen that pressing of any of the inch buttons or the fractional inch buttons will cause the positioning device to set the saw blade 217 at the desired position as soon as the lumber being cut allows the rollers 222 and 224 to drop or, if there is no lumber in the machine that the positioning device will react instantly to position the saw 217 at the desired position. It can be seen that pressing of any inch button associated with a greater dimension than the previously pressed inch button will cause the saw carriage 243 to be moved leftwardly until the particular inch pin desired is to the right of the vertical member 245 and is raised. This is true because the switch 333 associated with the desired inch pin will have its contact 343 in engagement with contact 345 until the vertical member 245 passes to the left of its associated inch pin.

In case the inch pin setting desired is of a lesser dimension than the previous inch setting of the device, there is no problem and the particular inch pin is free to be raised without first moving the vertical member 245 to the left of the inch pin. In such a situation the saw carriage 243 need only be retracted a sufficient distance to allow the engaged inch pin to drop or, in other words, only a sufficient distance to allow the inch carriage to abut the abutment 323.

It can be seen that pressing of any of the fractional inch pins will cause the inch carriage to be moved leftwardly until it actuates the switch 329 causing the solenoid 362 to be energized and to close its contacts 362'—362' thus allowing the particular combination of fractional pins selected to be raised by their respective solenoids. The arrangement of the fractional inch electrical circuit and its operation becomes obvious when one notes that the ⅛ inch, ⅜ inch, ⅝ inch and ⅞ inch positions are merely 0 inches plus ⅛ inch, ¼ inch plus ⅛ inch, ½ inch plus ⅛ inch and ¾ inch plus ⅛ inch, respectively.

We claim as our invention:

1. In a gauging device, a fixed abutment, an element mounted for forward movement toward and rearward movement away from said fixed abutment, power means for so moving said element, a stop carriage guided for movement along a path substantially parallel with the path of movement of said element and disposed between said element and said abutment, spring means yieldably urging said stop carriage away from said abutment, a plurality of stop members carried by said carriage and spaced at given intervals therealong in the line of movement of said carriage and selectively movable into and out of the forward path of said element, individual control means for each of said stop members, means connecting each such control means to energize said power means to move said element rearwardly concurrently with actuation of said control means to position any selected stop member in the path of said element, means for reversing the energization of said power means to shift said element forwardly, means actuated by rearward movement of said carriage to condition said reversing means for actuation, and means moving with said element and effective, when said reversing means is so conditioned, to actuate said reversing means whenever said element is more remote from said fixed abutment than is such a selected stop member.

2. In a gauging device, an element to be selectively positioned, first abutment means movable with said element, second abutment means, power means connected to move said first abutment means forwardly toward said second abutment means and rearwardly away from said second abutment means, a stop carriage disposed between said first and second abutment means and movable oppositely in substantial parallelism with the path of said element, a plurality of stop members carried by said carriage and selectively movable into and out of the path of said first abutment means, said stop members being spaced along said carriage in the line of movement of said carriage, means yieldably urging said stop carriage rearwardly, means for selectively positioning said stop members into and out of the path of said first abutment means, control means for conditioning said positioning means to position a selected one of said stop members into the path of said first abutment means and for concurrently energizing said power means to move said element rearwardly, means for reversing the energization of said power means to shift said element forwardly, means actuated by rearward movement of said carriage to condition said reversing means for actuation, and means moving with said element and effective, when said reversing means is so conditioned, to actuate said positioning means and reversing means whenever said first abutment means is more remote from said second abutment means than is such a selected stop member.

3. In a gauging device, a fixed abutment, a carrier mounted for forward movement toward and rearward movement away from said fixed abutment, a stop carriage guided for movement along a path substantially parallel with the path of movement of said carrier and disposed between said carrier and said abutment, spring means yieldably urging said stop carriage away from said abutment, barrier means limiting the amount of movement of said stop carriage away from said abutment, a plurality of stop members carried by said carriage and spaced at uniform intervals therealong in the line of movement of said carriage, means for selectively positioning said stop members into and out of the path of said carrier, power means connected to move said carrier toward and away from said abutment, control means for conditioning said positioning means to position a selected one of said stop members into the path of said carrier and for concurrently energizing said power means to move said carrier rearwardly, means for reversing the energization of said power means to shift said carrier forwardly, means actuated by said carriage when said carriage reaches said barrier to condition said reversing means for actuation, and means moving with said carrier and effective, when said reversing means is so conditioned, to actuate said positioning means and said reversing means whenever said carrier is more remote from said abutment than is such a selected stop member.

4. In a gauging device, a fixed abutment, a carrier mounted for forward movement toward and rearward movement away from said fixed abutment, a stop carriage guided for movement along a path substantially parallel with the path of movement of said carrier and disposed between said carrier and said abutment, spring means yieldably urging said stop carriage away from said abutment, a second stop carriage guided for movement along a path substantially parallel with said aforementioned paths and generally disposed between said first stop carriage and said abutment, spring means interposed between said abutment and said second stop carriage and yieldably urging said second stop carriage away from said abutment, barrier means limiting the amount of movement of said first stop carriage away from said abutment, a plurality of stop members carried by said first stop carriage, a plurality of stop members carried by said second stop carriage, the stop members on said first carriage being selectively movable into and out of the forward path of said carrier and the stop members on said second carriage being selectively movable into and out of the forward path of said first carriage, said plurality of stop members carried by said first stop carriage being spaced at equal intervals therealong in the line of movement of said carriages, said plurality of stop members carried by said second stop carriage being spaced at a fraction of the spacing interval of the plurality of stop members carried by said first stop carriage, power means connected to move said carrier toward and away from said abutment, positioning means for individually positioning a selected stop member on each carriage into and out of the respective paths into which they are movable, and individual control means for each of said stop members.

5. The apparatus of claim 4 additionally comprising a second barrier means for limiting the amount of movement of said second stop carriage away from said abutment, said second barrier means being so located that, when said first stop carriage engages said first barrier means and said second stop carriage engages said second barrier means, said first stop carriage is more remote from said abutment than said plurality of stop members on said second carriage.

6. The apparatus of claim 5 additionally comprising a second abutment carried by said second stop carriage at a position less remote from said first abutment than said plurality of stop members on said second stop carriage, said second abutment being located in the path of said first stop carriage and also located to engage said first abutment when said second stop carriage is moved toward said first abutment, and a further stop member carried by said second stop carriage, disposed between said first and second abutments and spaced from said second abutment at a fraction of the spacing interval of said plurality of stop members on said second stop carriage, said further stop member being movable into and out of a position wherein it will engage said first abutment to limit movement of said second stop carriage toward said first abutment.

7. In a gauging device, a fixed abutment, a carrier mounted for forward movement toward and rearward movement away from said fixed abutment, a first stop carriage guided for movement along a path substantially parallel with the path of movement of said carrier and disposed between said carrier and said abutment, spring means yieldably urging said stop carriage away from said abutment, a second stop carriage guided for movement along a path substantially parallel with said aforementioned paths and generally disposed between said first stop carriage and said abutment, spring means interposed between said abutment and said second stop carriage and yieldably urging said second stop carriage away from said abutment, barrier means limiting the amount of movement of said first stop carriage away from said abutment, a plurality of stop members carried by said first stop carriage and spaced at equal intervals therealong in the line of movement of said carriages, a plurality of stop members carried by said second stop carriage and spaced at a fraction of the spacing interval of the plurality of stop members carried by said first stop carriage, the stop members on said first carriage being selectively movable into and out of the forward path of said carrier and the stop members on said second carriage being selectively movable into and out of the forward path of said first carriage, power means connected to move said carrier toward and away from said abutment, positioning means for individually positioning a selected stop member on each carriage into and out of the respective paths into which they are movable, a second barrier means for limiting the amount of movement of said second stop carriage away from said abutment, said second barrier means being so located that, when said first stop carriage engages said first barrier means and said second stop carriage engages said second barrier means, said first stop carriage is more remote from said abutment than said plurality of stop members on said second carriage, control means for conditioning said positioning means to position a selected stop member on each carriage into the respective paths into which they are movable and for concurrently actuating said power means to move said carrier rearwardly, means actuated by said first carriage when said first carriage reaches said first barrier to condition said power means to move said carrier forwardly and to actuate said positioning means, when so conditioned, to position the selected stop member on the second stop carriage into the path of said first stop carriage, and means moving with said carrier and effective, whenever said carrier is more remote from said abutment than is the selected stop member of said first carriage and when said positioning means is so conditioned, to actuate said positioning means to position the selected stop member of said first carriage into the path of said carrier, said last claimed means also being effective, whenever said carrier is more remote from said abutment than is the selected stop member of said first carriage and when said power means is so conditioned, to actuate said power means to move said carrier forwardly.

8. The apparatus of claim 7 additionally comprising a guide fixed to said carrier and having a guiding surface facing forwardly for guiding a piece of material to be moved perpendicularly to the direction of movement of said carrier, means for moving a piece of material perpendicularly of the direction of movement of said carrier, said guide being located to position the piece of material laterally as it enters said moving means, and control means associated with said moving means and effective, immediately upon engagement of a piece of material by said moving means, to actuate said power means to move said guide rearwardly out of guiding relation to such piece of material.

9. In a gauging device, a fixed abutment, a carrier mounted for forward movement toward and rearward movement away from said fixed abutment, a first stop carriage guided for movement along a path substantially parallel with the path of movement of said carrier and disposed between said carrier and said abutment, spring means yieldably urging said stop carriage away from said abutment, a second stop carriage guided for movement along a path substantially parallel with said aforementioned paths and generally disposed between said first stop carriage and said abutment, spring means interposed between said abutment and said second stop carriage and yieldably urging said second stop carriage away from said abutment, barrier means limiting the amount of movement of said first stop carriage away from said abutment, a plurality of stop members carried by said first stop carriage and spaced at equal intervals therealong in the line of movement of said carriages, a plurality of stop members carried by said second stop carriage and spaced at a fraction of the spacing interval of the plurality of stop members carried by said first stop carriage, the stop members on said first carriage being selectively movable into and out of the forward path of said carrier and the stop members on said second carriage being selectively movable into and out of the forward path of said first carriage, power means connected to move said carrier toward and away from said abutment, positioning means for individually positioning a selected stop member on each carriage into and out of the respective paths into which they are movable, a second barrier means for limiting the amount of movement of said second stop carriage away from said abutment, said second barrier means being so located that, when said first stop carriage engages said first barrier means and said second stop carriage engages said second barrier means, said first stop carriage is more remote from said abutment than said plurality of stop members on said second carriage, control means for conditioning said positioning means to position a selected stop member on each carriage into the respective paths into which they are movable and for concurrently actuating said power means to move said carrier rearwardly, means actuated by said first carriage when said first carriage reaches said first barrier to condition said power means to move said carrier forwardly and to actuate said positioning means, when so conditioned, to position the selected stop member on the second stop carriage into the path of said first stop carriage, means moving with said carrier and effective, whenever said carrier is more remote from said abutment than is the selected stop member of said first carriage and when said positioning means is so conditioned, to actuate said positioning means to position the selected stop member of said first carriage into the path of said carrier, said last claimed means also being effective, whenever said carrier is more remote from said abutment than is the selected stop member of said first carriage and when said power means is so conditioned, to actuate said power means to move said carrier forwardly, rotary saw means carried by said carrier, said saw means operable to saw in a plane perpendicular to the direction of movement of said carrier, and a second rotary saw means mounted at a fixed location in the line of movement of said carrier and operable to saw in a plane parallel to the plane of said first saw means, whereby the positioning of said carrier spaces said saw a desired distance apart.

10. In a gauging device, a fixed abutment, an element mounted for forward movement toward and rearward movement away from said fixed abutment, a stop carriage guided for movement along a path substantially parallel with the path of movement of said element, spring means yieldably urging said element away from said abutment, spring means interposed between said abutment and said stop carriage and yieldably urging said stop carriage away from said abutment, barrier means limiting the amount of movement of said element away from said abutment, a plurality of stop members carried by said stop carriage and spaced at uniform intervals therealong in the line of movement of said element, said plurality of stop members being selectively movable into and out of the forward path of said element, an abutment carried by said stop carriage at a position less remote from said fixed abutment than said plurality of stop members on said stop carriage, said second mentioned abutment being located in the path of said element and also located to engage said fixed abutment when said stop carriage is moved toward said fixed abutment, a further stop member carried by said stop carriage, disposed between said abutments and spaced from said second mentioned abutment at a fraction of the spacing interval of said plurality of stop members, said further stop member being movable into and out of a position wherein it will engage said fixed abutment to limit movement of said stop carriage toward said fixed abutment, a second barrier means for limiting the amount of movement of said stop carriage away from said abutment, said second barrier means being so located that, when said element engages said first barrier means and when said stop carriage engages said second barrier means, said element is more remote from said abutment than said plurality of stop members, positioning means for individually positioning a selected one of said plurality of stop members into and out of the forward path of said element, power means for moving said element forwardly toward said fixed abutment, control means for conditioning said positioning means to position a selected one of said plurality of stop members into the forward path of said element and for deactivating said power means to allow said element and carriage to move rearwardly under the action of said springs, and means actuated by said element when said element reaches said first barrier to actuate said positioning means, when so conditioned, to position the selected one of said plurality of stop members into the path of said element and to actuate said power means to move said element forwardly.

11. Sawing apparatus comprising sawing means operable to saw in a plane, a guide located for positioning material to be moved into engagement wtih said sawing means, said guide having a guiding face parallel with the plane of said sawing means, power means for moving said guide perpendicularly to said plane, means for engaging and moving material guided by said guide into engagement with said sawing means, and control means disposed in the path of, and engaged by, material moving under the influence of said engaging and moving means, said control means being effective, when so engaged, to actuate said power means to retract said guide from engagement with said material.

12. Sawing apparatus comprising sawing means operable to saw in a plane, a guide located for positioning material to be moved into engagement with said sawing means, said guide having a guiding face parallel with the plane of said sawing means, power means for moving said guide perpendicularly of said plane, means for engaging and moving material guided by said guide into engagement with said sawing means, and control means disposed in the path of, and engaged by, material moving under the influence of said engaging and moving means, said control means being effective, when so engaged, to actuate said power means to retract said guide from engagement with said material and further being effective, when such material moves out of engagement therewith, to actuate said power means to return said guide to its previous position.

13. In a gauging device, a first element, a second element, power means for moving said second element forwardly and backwardly through a path, a plurality of stop members carried by said first element and spaced at given intervals therealong in the directions of movement of said second element, means for individually positioning each stop member into and out of the forward path of said second element, control means for conditioning said positioning means to position a previously selected one of said stop members out of the path of said first element and to position a newly selected one of said stop members into the path of said first element, said control means being arranged to actuate said power means to start rearward movement of said second element and to insure that such rearward movement continues a sufficient distance to cause said second element to disengage the previously selected stop member whereby it is positioned out of the path of said second element, said control means further comprising cam operated switching means carried by said first and second elements and effective, when said second element is rearward of the newly selected stop member and when said positioning means is conditioned to so position the newly selected one of said stop members, to actuate said positioning means to position the newly selected stop member into the path of said second element, said switching means also being effective, when said power means has moved said second element rearwardly only a sufficient distance to disengage the previously selected stop member and to allow the newly selected stop member to be positioned into the path of the second element, to actuate said power means to move said second element forwardly into engagement with the newly selected stop member.

14. In a gauging device, an element to be selectively positioned, first abutment means movable with said element, second abutment means, power means connected to move said first abutment means forwardly toward said second abutment means and rearwardly away from said second abutment means, a stop carriage disposed between said first and second abutment means and movable oppositely in substantial parallelism with the path of said element, a plurality of stop members carried by said carriage and selectively movable into and out of the path of said first abutment means, said stop members being variously spaced along said carriage in the line of movement of said carriage, electrically actuated means connected to control the position of each of said stop members, spring means yieldably urging said stop carriage rearwardly, further electrically actuated means connected to dominate said power means, a first electric circuit effective, when energized, to cause said further electrically actuated means to energize said power means to shift said element rearwardly, a second electric circuit effective, when energized, to cause said further electrically actuated means to energize said power means to shift said element forwardly, control means for said first-named electrically actuated means effective, upon actuation for moving any selected stop member into the path of said first abutment means, to energize said first electric circuit, switch means actuated by rearward movement of said stop carriage to condition said second electric circuit for energization, and means moving with said element and effective to close said second electric circuit, when so conditioned, whenever said first abutment means has attained a position more remote from said second abutment means than is such a selected stop member.

15. In a gauging device, a fixed abutment, a carrier mounted for forward movement toward and rearward movement away from said fixed abutment, a stop carriage guided for movement along a path substantially parallel with the path of movement of said carrier and disposed between said carrier and said abutment, spring means yieldably urging said stop carriage away from said abutment, barrier means limiting the degree of movement of said stop carriage away from said abutment, a plurality of stop members carried by said carriage, spaced at uniform intervals therealong in the line of movement of said carriage, power means connected to move said carrier toward and away from said abutment, a like plurality of control keys, means connecting each control key to energize said power means to move said carrier away from said abutment, means connecting each control key to shift its corresponding stop member into the forward path of said carrier, means for reversing the energization of said power means, means actuated by said carriage when said carriage reaches said barrier to condition said reversing means for actuation, and means moving with said carrier and effective, when said reversing means is so conditioned, to actuate said reversing means whenever said carrier is in a position more remote from said abutment than is such corresponding stop member.

16. In a gauging device, a fixed abutment, a carrier mounted for forward movement toward and rearward movement away from said fixed abutment, a stop carriage guided for movement along a path substantially parallel with the path of movement of said carrier and disposed between said carrier and said abutment, a second stop carriage guided for movement along a path substantially parallel with said aforementioned paths and disposed between said first stop carriage and said abutment, spring means interposed between said abutment and said second stop carriage and yieldably urging said second stop carriage away from said abutment, spring means interposed between said stop carriages and yieldably urging said stop carriages apart, barrier means limiting the degree of movement of said first stop carriage away from said abutment, a plurality of stop members carried by each of said carriages and spaced at intervals therealong in the line of movement of said carriages, the stop members on said first carriage being selectively movable into and out of the forward path of said carrier and the stop members on said second carriage being selectively movable into and out of the forward path of said first carrier, power means connected to move said carrier toward and away from said abutment, a like plurality of control keys, means connecting each control key to energize said power means to move said carrier away from said abutment, means connecting each control key to shift its corresponding stop member into such forward path, means for reversing the energization of said power means, means actuated by said first carriage when said first carriage reaches said barrier to condition said reversing means for actuation, and means moving with said carrier and effective, when said reversing means is so conditioned, to actuate said reversing means whenever said carrier is in a position more remote from said abutment than is such corresponding stop member.

References Cited in the file of this patent

UNITED STATES PATENTS

| | | |
|---|---|---|
| 1,295,587 | Peter | Feb. 25, 1919 |
| 1,725,861 | Grueter | Aug. 27, 1928 |
| 1,838,647 | Watters et al. | Dec. 29, 1931 |
| 2,291,982 | Overacker et al. | Aug. 4, 1942 |
| 2,431,906 | Arnason | Dec. 2, 1947 |
| 2,507,644 | Peters | May 16, 1950 |
| 2,526,788 | Winkler | Oct. 24, 1950 |
| 2,613,703 | Calvert | Oct. 14, 1952 |
| 2,707,501 | Craik | May 3, 1955 |
| 2,714,906 | Peterson | Aug. 9, 1955 |
| 2,740,004 | Baldasore | Mar. 27, 1956 |
| 2,745,446 | Deiry et al. | May 15, 1956 |

FOREIGN PATENTS

| | | |
|---|---|---|
| 668,638 | Germany | Dec. 7, 1938 |